US010400310B2

(12) United States Patent
Hatanaka et al.

(10) Patent No.: US 10,400,310 B2
(45) Date of Patent: *Sep. 3, 2019

(54) METHOD FOR SEPARATION OF RARE EARTH ION

(71) Applicant: KABUSHIKI KAISHA TOYOTA CHUO KENKYUSHO, Nagakute-shi, Aichi-ken (JP)

(72) Inventors: Takaaki Hatanaka, Nagakute (JP); Takao Tani, Nagakute (JP); Nobuhiro Ishida, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 621 days.

This patent is subject to a terminal disclaimer.

(21) Appl. No.: 14/972,702

(22) Filed: Dec. 17, 2015

(65) Prior Publication Data

US 2016/0177419 A1 Jun. 23, 2016

(30) Foreign Application Priority Data

Dec. 19, 2014 (JP) ................................ 2014-256938

(51) Int. Cl.

| | |
|---|---|
| ***A61K 38/10*** | (2006.01) |
| ***C22B 59/00*** | (2006.01) |
| ***C22B 3/42*** | (2006.01) |

(52) U.S. Cl.

CPC ................ *C22B 59/00* (2013.01); *C22B 3/42* (2013.01); *Y02P 10/234* (2015.11)

(58) Field of Classification Search

None

See application file for complete search history.

(56) References Cited

U.S. PATENT DOCUMENTS

2003/0228622 A1 12/2003 Imperiali et al.
2017/0008926 A1* 1/2017 Hatanaka ................. C07K 7/06

FOREIGN PATENT DOCUMENTS

| | | | |
|---|---|---|---|
| JP | 2003-284556 | A | 10/2003 |
| JP | 2004-000092 | A | 1/2004 |
| JP | 2013-181021 | A | 9/2013 |
| JP | 2014-051449 | A | 3/2014 |
| WO | 2015/111407 | A1 | 7/2015 |

OTHER PUBLICATIONS

Tamura, Atsuo "Sentakuteki rea asu kaishunou o motta jinkosekkei pepuchido shugotai no seisei ( Creation of artificcialy designed peptide assembly having selective rare earth collection capability)", working paper by Hyogo Science and Technology Association, 2013, vol. 2013.

Nov. 29, 2016 Office Action issued in Japanese Patent Application No. 2014-256938.

* cited by examiner

*Primary Examiner* — Maury A Audet

(74) *Attorney, Agent, or Firm* — Oliff PLC

(57) ABSTRACT

A method for identifying and separating a rare earth ion. The method includes bringing one or more rare earth ions into contact with a mineralization agent capable of mineralizing the rare earth ions, wherein the one or more rare earth ions are separated as rare earth minerals, based on a mineralization tendency of the mineralization agent with respect to a rare earth ion series.

11 Claims, 20 Drawing Sheets

Specification includes a Sequence Listing.

Verification of concentration of $Nd_2O_3$ binding phage from random peptide phage library Verification of binding of synthetic peptide and $Dy_2O_3$
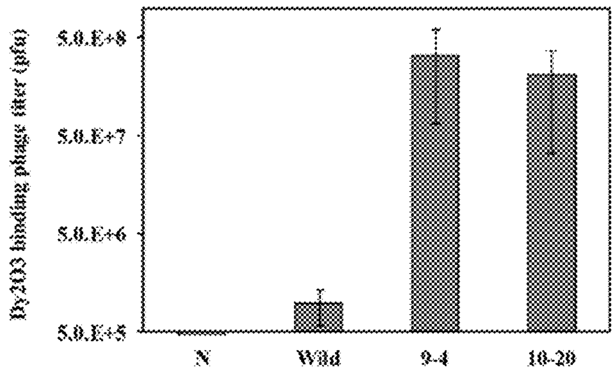
Verification of binding of synthetic peptide and $Nd_2O_3$
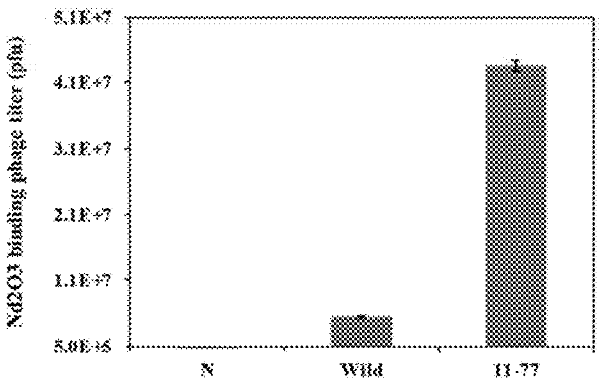
Fig.3

Binding specificity of Lamp1 synthetic peptide

Binding specificity of Lamp2 synthetic peptide

Alanine substitution test of Lamp 1 peptide

| Phage Clone | SEQ ID NO | Sequence | | | | | | | | | | | | | | |
|---|---|---|---|---|---|---|---|---|---|---|---|---|---|---|---|---|
| Lamp1 | 4 | S | C | L | W | G | D | V | S | E | L | D | F | L | C | S |
| Lamp1-1SA | 62 | A | C | L | W | G | D | V | S | E | L | D | F | L | C | S |
| Lamp1-2CA | 63 | S | A | L | W | G | D | V | S | E | L | D | F | L | C | S |
| Lamp1-3LA | 64 | S | C | A | W | G | D | V | S | E | L | D | F | L | C | S |
| Lamp1-4WA | 65 | S | C | L | A | G | D | V | S | E | L | D | F | L | C | S |
| Lamp1-5GA | 66 | S | C | L | W | A | D | V | S | E | L | D | F | L | C | S |
| Lamp1-6DA | 67 | S | C | L | W | G | A | V | S | E | L | D | F | L | C | S |
| Lamp1-7VA | 68 | S | C | L | W | G | D | A | S | E | L | D | F | L | C | S |
| Lamp1-8SA | 69 | S | C | L | W | G | D | V | A | E | L | D | F | L | C | S |
| Lamp1-9EA | 70 | S | C | L | W | G | D | V | S | A | L | D | F | L | C | S |
| Lamp1-10LA | 71 | S | C | L | W | G | D | V | S | E | A | D | F | L | C | S |
| Lamp1-11DA | 72 | S | C | L | W | G | D | V | S | E | L | A | F | L | C | S |
| Lamp1-12FA | 73 | S | C | L | W | G | D | V | S | E | L | D | A | L | C | S |
| Lamp1-13LA | 74 | S | C | L | W | G | D | V | S | E | L | D | F | A | C | S |
| Lamp1-14CA | 75 | S | C | L | W | G | D | V | S | E | L | D | F | L | A | S |
| Lamp1-15SA | 76 | S | C | L | W | G | D | V | S | E | L | D | F | L | C | A |

Fig.9

Alanine substitutiont test of Lamp 1 peptide

Isolated sequences from Lamp 1 partial mutation peptide library

| Phage Clone | SEQ ID NO | Sequence | Frequency |
|---|---|---|---|
| Lamp1 | 4 | S C L W G D V S E L D F L C S | 1/12 |
| 10 | 5 | S C L W I E S L D L D G L C S | 1/12 |
| 50 | 6 | S C L C C E V S D L G L V C S | 1/12 |
| 44 | 7 | S C V C I E R R E L D L L C S | 1/12 |
| 14 | 8 | S C I D S Y V G E L E T L G S | 1/12 |
| 19 | 9 | S C L W R A V C D L G I E C S | 1/12 |
| 41 | 10 | S C L G G D M S D K P V S C S | 1/12 |
| 12 | 11 | S C T C G M V N D V D L T C S | 1/12 |
| 2-30 | 12 | S C I V G E V R L S D L V C S | 1/12 |
| 12 | 13 | S C T C G M V N D V D L T C S | 1/12 |
| 9,11 | 14 | S C V W R G F K D G Q W F C S | 2/12 |
| 42 | 15 | S C V C R G L R D L A H N C S | 1/12 |

Fig.11

Isolated sequences from Lamp 2 partial mutation peptide library

| phage clone | SEQ ID NO | Sequence | frequency |
| --- | --- | --- | --- |
| Lamp2 | 16 | S C L Y P S W S D Y A F C S | 1/15 |
| 62 | 17 | S C T D P S W G E Y G F C S | 1/15 |
| 8 | 18 | S C E Y S S A S E Y A R C S | 1/15 |
| 1-26 | 19 | S C I Y G E W R D Y A F C S | 1/15 |
| 63 | 20 | S C V Y L S G S E C T F C S | 1/15 |
| 61 | 21 | S C L N A R W S D S P V C S | 1/15 |
| 1-34 | 22 | S C L N T I W A D Y G L G S | 1/15 |
| 77 | 23 | S C V D V S W G D I A C C S | 1/15 |
| 1-35 | 24 | S C F E F S W S E D C A C S | 1/15 |
| 1-27 | 25 | S W E R G S W C E D A C C S | 1/15 |
| 10 | 26 | S C V Y T G W R E D A S C S | 1/15 |
| 12 | 27 | S C C F A S C T D S A L C S | 1/15 |
| 13 | 28 | S C T R S R C G E G A F C S | 1/15 |
| 1-31 | 29 | S W Y V A I M S D K S F C S | 1/15 |
| 16 | 30 | S C I E A R Y T D H A L C S | 1/15 |

Fig.12

Results of elemental analysis of particles produced

Effect of pH on mineralization activity

Effect of pH on mineralization activity

Effect of temperature on mineralization activity

Effect of temperature on mineralization activity

TEM image of particle produced

```
SEQUENCE LISTING

<160> NUMBER OF SEQ ID NOS: 76

<210> SEQ ID NO 1
<211> LENGTH: 11
```

```
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (1)..(3)
<223> OTHER INFORMATION: Xaa can be any naturally occurring amino acid
<220> FEATURE:
<221> NAME/KEY: misc_feature
<222> LOCATION: (4)..(4)
<223> OTHER INFORMATION: Xaa can be any acidic amino acid
<220> FEATURE:
<221> NAME/KEY: misc_feature
<222> LOCATION: (5)..(6)
<223> OTHER INFORMATION: Xaa can be any naturally occurring amino acid
<220> FEATURE:
<221> NAME/KEY: misc_feature
<222> LOCATION: (7)..(7)
<223> OTHER INFORMATION: Xaa can be any acidic amino acid
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: misc_feature
<222> LOCATION: (9)..(9)
<223> OTHER INFORMATION: Xaa can be any acidic amino acid
<220> FEATURE:
<221> NAME/KEY: misc_feature
<222> LOCATION: (10)..(11)
<223> OTHER INFORMATION: Xaa can be any naturally occurring amino acid

<400> SEQUENCE: 1

Xaa Xaa Xaa Xaa Xaa Xaa Xaa Xaa Xaa Xaa Xaa
1               5                   10


<210> SEQ ID NO 2
<211> LENGTH: 10
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (1)..(6)
<223> OTHER INFORMATION: Xaa can be any naturally occurring amino acid
<220> FEATURE:
<221> NAME/KEY: misc_feature
<222> LOCATION: (7)..(7)
<223> OTHER INFORMATION: Xaa can be any acidic acid
<220> FEATURE:
<221> NAME/KEY: misc_feature
<222> LOCATION: (8)..(10)
<223> OTHER INFORMATION: Xaa can be any naturally occurring amino acid

<400> SEQUENCE: 2

Xaa Xaa Xaa Xaa Xaa Xaa Xaa Xaa Xaa Xaa
1               5                   10


<210> SEQ ID NO 3
<211> LENGTH: 12
<212> TYPE: PRT
<213> ORGANISM: Artificial Sequence
<220> FEATURE:
<223> OTHER INFORMATION: Synthetic peptide
<220> FEATURE:
<221> NAME/KEY: MISC_FEATURE
<222> LOCATION: (6)..(6)
<223> OTHER INFORMATION: Xaa can be any acidic amino acid
<220> FEATURE:
<221> NAME/KEY: MISC_FEATURE
<222> LOCATION: (9)..(9)
<223> OTHER INFORMATION: Xaa can be any acidic amino acid
```

-continued

```
<400> SEQUENCE: 3

Pro Val Trp Phe Ser Xaa Val Gly Xaa Phe Met Val
1               5                   10


<210> SEQ ID NO 4
<211> LENGTH: 15
<212> TYPE: PRT
<213> ORGANISM: Artificial
<220> FEATURE:
<223> OTHER INFORMATION: Synthetic peptide

<400> SEQUENCE: 4

Ser Cys Leu Trp Gly Asp Val Ser Glu Leu Asp Phe Leu Cys Ser
1               5                   10                  15


<210> SEQ ID NO 5
<211> LENGTH: 15
<212> TYPE: PRT
<213> ORGANISM: Artificial
<220> FEATURE:
<223> OTHER INFORMATION: Synthetic peptide

<400> SEQUENCE: 5

Ser Cys Leu Trp Ile Glu Ser Leu Asp Leu Asp Gly Leu Cys Ser
1               5                   10                  15


<210> SEQ ID NO 6
<211> LENGTH: 15
<212> TYPE: PRT
<213> ORGANISM: Artificial
<220> FEATURE:
<223> OTHER INFORMATION: Synthetic peptide

<400> SEQUENCE: 6

Ser Cys Leu Cys Cys Glu Val Ser Asp Leu Gly Leu Val Cys Ser
1               5                   10                  15


<210> SEQ ID NO 7
<211> LENGTH: 15
<212> TYPE: PRT
<213> ORGANISM: Artificial
<220> FEATURE:
<223> OTHER INFORMATION: Synthetic peptide

<400> SEQUENCE: 7

Ser Cys Val Cys Ile Glu Arg Arg Glu Leu Asp Leu Leu Cys Ser
1               5                   10                  15


<210> SEQ ID NO 8
<211> LENGTH: 15
<212> TYPE: PRT
<213> ORGANISM: Artificial
<220> FEATURE:
<223> OTHER INFORMATION: Synthetic peptide

<400> SEQUENCE: 8

Ser Cys Ile Asp Ser Tyr Val Gly Glu Leu Glu Thr Leu Cys Ser
1               5                   10                  15


<210> SEQ ID NO 9
<211> LENGTH: 15
<212> TYPE: PRT
<213> ORGANISM: Artificial
<220> FEATURE:
<223> OTHER INFORMATION: Synthetic peptide

<400> SEQUENCE: 9
```

```
Ser Cys Leu Trp Arg Ala Val Cys Asp Leu Gly Ile Glu Cys Ser
1               5                   10                  15


<210> SEQ ID NO 10
<211> LENGTH: 15
<212> TYPE: PRT
<213> ORGANISM: Artificial
<220> FEATURE:
<223> OTHER INFORMATION: Synthetic peptide

<400> SEQUENCE: 10

Ser Cys Leu Gly Gly Asp Met Ser Asp Lys Pro Val Ser Cys Ser
1               5                   10                  15


<210> SEQ ID NO 11
<211> LENGTH: 15
<212> TYPE: PRT
<213> ORGANISM: Artificial
<220> FEATURE:
<223> OTHER INFORMATION: Synthetic peptide

<400> SEQUENCE: 11

Ser Cys Thr Cys Gly Met Val Asn Asp Val Asp Leu Thr Cys Ser
1               5                   10                  15


<210> SEQ ID NO 12
<211> LENGTH: 15
<212> TYPE: PRT
<213> ORGANISM: Artificial
<220> FEATURE:
<223> OTHER INFORMATION: Synthetic peptide

<400> SEQUENCE: 12

Ser Cys Ile Val Gly Glu Val Arg Leu Ser Asp Leu Val Cys Ser
1               5                   10                  15


<210> SEQ ID NO 13
<211> LENGTH: 15
<212> TYPE: PRT
<213> ORGANISM: Artificial
<220> FEATURE:
<223> OTHER INFORMATION: Synthetic peptide

<400> SEQUENCE: 13

Ser Cys Thr Cys Gly Met Val Asn Asp Val Asp Leu Thr Cys Ser
1               5                   10                  15


<210> SEQ ID NO 14
<211> LENGTH: 15
<212> TYPE: PRT
<213> ORGANISM: Artificial
<220> FEATURE:
<223> OTHER INFORMATION: Synthetic peptide

<400> SEQUENCE: 14

Ser Cys Val Trp Arg Gly Phe Lys Asp Gly Gln Trp Phe Cys Ser
1               5                   10                  15


<210> SEQ ID NO 15
<211> LENGTH: 15
<212> TYPE: PRT
<213> ORGANISM: Artificial
<220> FEATURE:
<223> OTHER INFORMATION: Synthetic peptide

<400> SEQUENCE: 15
```

Ser Cys Val Cys Arg Gly Leu Arg Asp Leu Ala His Asn Cys Ser
1 5 10 15

<210> SEQ ID NO 16
<211> LENGTH: 14
<212> TYPE: PRT
<213> ORGANISM: Artificial
<220> FEATURE:
<223> OTHER INFORMATION: Synthetic peptide

<400> SEQUENCE: 16

Ser Cys Leu Tyr Pro Ser Trp Ser Asp Tyr Ala Phe Cys Ser
1 5 10

<210> SEQ ID NO 17
<211> LENGTH: 14
<212> TYPE: PRT
<213> ORGANISM: Artificial
<220> FEATURE:
<223> OTHER INFORMATION: Synthetic peptide

<400> SEQUENCE: 17

Ser Cys Thr Asp Pro Ser Trp Gly Glu Tyr Gly Phe Cys Ser
1 5 10

<210> SEQ ID NO 18
<211> LENGTH: 14
<212> TYPE: PRT
<213> ORGANISM: Artificial
<220> FEATURE:
<223> OTHER INFORMATION: Synthetic peptide

<400> SEQUENCE: 18

Ser Cys Glu Tyr Ser Ser Ala Ser Glu Tyr Ala Arg Cys Ser
1 5 10

<210> SEQ ID NO 19
<211> LENGTH: 14
<212> TYPE: PRT
<213> ORGANISM: Artificial
<220> FEATURE:
<223> OTHER INFORMATION: Synthetic peptide

<400> SEQUENCE: 19

Ser Cys Ile Tyr Gly Glu Trp Arg Asp Tyr Ala Phe Cys Ser
1 5 10

<210> SEQ ID NO 20
<211> LENGTH: 14
<212> TYPE: PRT
<213> ORGANISM: Artificial
<220> FEATURE:
<223> OTHER INFORMATION: Synthetic peptide

<400> SEQUENCE: 20

Ser Cys Val Tyr Leu Ser Gly Ser Glu Cys Thr Phe Cys Ser
1 5 10

<210> SEQ ID NO 21
<211> LENGTH: 14
<212> TYPE: PRT
<213> ORGANISM: Artificial
<220> FEATURE:
<223> OTHER INFORMATION: Synthetic peptide

<400> SEQUENCE: 21

Ser Cys Leu Asn Ala Arg Trp Ser Asp Ser Pro Val Cys Ser 1 5 10

<210> SEQ ID NO 22
<211> LENGTH: 14
<212> TYPE: PRT
<213> ORGANISM: Artificial
<220> FEATURE:
<223> OTHER INFORMATION: Synthetic peptide

<400> SEQUENCE: 22

Ser Cys Leu Asn Thr Ile Trp Ala Asp Tyr Gly Leu Cys Ser
1 5 10

<210> SEQ ID NO 23
<211> LENGTH: 14
<212> TYPE: PRT
<213> ORGANISM: Artificial
<220> FEATURE:
<223> OTHER INFORMATION: Synthetic peptide

<400> SEQUENCE: 23

Ser Cys Lys Asp Val Ser Trp Gly Asp Ile Ala Cys Cys Ser
1 5 10

<210> SEQ ID NO 24
<211> LENGTH: 14
<212> TYPE: PRT
<213> ORGANISM: Artificial
<220> FEATURE:
<223> OTHER INFORMATION: Synthetic peptide

<400> SEQUENCE: 24

Ser Cys Phe Glu Phe Ser Trp Ser Glu Asp Cys Ala Cys Ser
1 5 10

<210> SEQ ID NO 25
<211> LENGTH: 14
<212> TYPE: PRT
<213> ORGANISM: Artificial
<220> FEATURE:
<223> OTHER INFORMATION: Synthetic peptide

<400> SEQUENCE: 25

Ser Cys Glu Arg Gly Ser Trp Cys Glu Asp Ala Cys Cys Ser
1 5 10

<210> SEQ ID NO 26
<211> LENGTH: 14
<212> TYPE: PRT
<213> ORGANISM: Artificial
<220> FEATURE:
<223> OTHER INFORMATION: Synthetic peptide

<400> SEQUENCE: 26

Ser Cys Val Tyr Thr Gly Trp Arg Glu Asp Ala Ser Cys Ser
1 5 10

<210> SEQ ID NO 27
<211> LENGTH: 14
<212> TYPE: PRT
<213> ORGANISM: Artificial
<220> FEATURE:
<223> OTHER INFORMATION: Synthetic peptide

<400> SEQUENCE: 27

Ser Cys Cys Phe Ala Ser Cys Thr Asp Ser Ala Leu Cys Ser
1 5 10

```
<210> SEQ ID NO 28
<211> LENGTH: 14
<212> TYPE: PRT
<213> ORGANISM: Artificial
<220> FEATURE:
<223> OTHER INFORMATION: Synthetic peptide

<400> SEQUENCE: 28

Ser Cys Thr Arg Ser Arg Cys Gly Asp Gly Ala Phe Cys Ser
1               5                   10


<210> SEQ ID NO 29
<211> LENGTH: 14
<212> TYPE: PRT
<213> ORGANISM: Artificial
<220> FEATURE:
<223> OTHER INFORMATION: Synthetic peptide

<400> SEQUENCE: 29

Ser Cys Tyr Val Ala Ile Met Ser Glu Lys Ser Phe Cys Ser
1               5                   10


<210> SEQ ID NO 30
<211> LENGTH: 14
<212> TYPE: PRT
<213> ORGANISM: Artificial
<220> FEATURE:
<223> OTHER INFORMATION: Synthetic peptide

<400> SEQUENCE: 30

Ser Cys Ile Glu Ala Arg Tyr Thr Asp His Ala Leu Cys Ser
1               5                   10


<210> SEQ ID NO 31
<211> LENGTH: 16
<212> TYPE: PRT
<213> ORGANISM: Artificial Sequence
<220> FEATURE:
<223> OTHER INFORMATION: Synthetic peptide

<400> SEQUENCE: 31

Ser Cys Pro Val Trp Phe Ser Asp Val Gly Asp Phe Met Val Cys Ser
1               5                   10                  15


<210> SEQ ID NO 32
<211> LENGTH: 16
<212> TYPE: PRT
<213> ORGANISM: Artificial Sequence
<220> FEATURE:
<223> OTHER INFORMATION: Synthetic peptide

<400> SEQUENCE: 32

Ser Cys Pro Val Trp Phe Ser Asp Val Gly Glu Phe Met Val Cys Ser
1               5                   10                  15


<210> SEQ ID NO 33
<211> LENGTH: 16
<212> TYPE: PRT
<213> ORGANISM: Artificial Sequence
<220> FEATURE:
<223> OTHER INFORMATION: Synthetic peptide

<400> SEQUENCE: 33

Ser Cys Pro Val Trp Phe Ser Glu Val Gly Asp Phe Met Val Cys Ser
1               5                   10                  15
```

<210> SEQ ID NO 34
<211> LENGTH: 16
<212> TYPE: PRT
<213> ORGANISM: Artificial Sequence
<220> FEATURE:
<223> OTHER INFORMATION: Synthetic peptide

<400> SEQUENCE: 34

Ser Cys Pro Val Trp Phe Ser Glu Val Gly Glu Phe Met Val Cys Ser
1 5 10 15

<210> SEQ ID NO 35
<211> LENGTH: 35
<212> TYPE: DNA
<213> ORGANISM: Artificial
<220> FEATURE:
<223> OTHER INFORMATION: Synthetic nucleotide

<400> SEQUENCE: 35
atgattacca ggatccgaat tcaggtggag gttcg 35

<210> SEQ ID NO 36
<211> LENGTH: 27
<212> TYPE: DNA
<213> ORGANISM: Artificial
<220> FEATURE:
<223> OTHER INFORMATION: Synthetic nucleotide

<400> SEQUENCE: 36
actatcgtcg gccgcaagct tttagct 27

<210> SEQ ID NO 37
<211> LENGTH: 23
<212> TYPE: DNA
<213> ORGANISM: Artificial
<220> FEATURE:
<223> OTHER INFORMATION: Synthetic nucleotide

<400> SEQUENCE: 37
cgaattcagg tggaggttcg tgt 23

<210> SEQ ID NO 38
<211> LENGTH: 23
<212> TYPE: DNA
<213> ORGANISM: Artificial Sequence
<220> FEATURE:
<223> OTHER INFORMATION: Synthetic nucleotides

<400> SEQUENCE: 38
tgtagctaaa agcttgcggc cga 23

<210> SEQ ID NO 39
<211> LENGTH: 41
<212> TYPE: DNA
<213> ORGANISM: Artificial
<220> FEATURE:
<223> OTHER INFORMATION: Synthetic nucleotide

<400> SEQUENCE: 39
aggatccgaa ttcaggtgga ggtgcatgtt tgtggggtga t 41

<210> SEQ ID NO 40
<211> LENGTH: 41
<212> TYPE: DNA
<213> ORGANISM: Artificial
<220> FEATURE:

<223> OTHER INFORMATION: Synthetic nucleotide

<400> SEQUENCE: 40
atccgaattc aggtggaggt tcggcattgt ggggtgatgt t 41

<210> SEQ ID NO 41
<211> LENGTH: 44
<212> TYPE: DNA
<213> ORGANISM: Artificial
<220> FEATURE:
<223> OTHER INFORMATION: Synthetic nucleotide

<400> SEQUENCE: 41
atccgaattc aggtggaggt tcgtgtgcat ggggtgatgt tagt 44

<210> SEQ ID NO 42
<211> LENGTH: 47
<212> TYPE: DNA
<213> ORGANISM: Artificial
<220> FEATURE:
<223> OTHER INFORMATION: Synthetic nucleotide

<400> SEQUENCE: 42
atccgaattc aggtggaggt tcgtgtttgg caggtgatgt tagtgag 47

<210> SEQ ID NO 43
<211> LENGTH: 50
<212> TYPE: DNA
<213> ORGANISM: Artificial
<220> FEATURE:
<223> OTHER INFORMATION: Synthetic nucleotide

<400> SEQUENCE: 43
atccgaattc aggtggaggt tcgtgtttgt gggcagatgt tagtgagctg 50

<210> SEQ ID NO 44
<211> LENGTH: 53
<212> TYPE: DNA
<213> ORGANISM: Artificial
<220> FEATURE:
<223> OTHER INFORMATION: Synthetic nucleotide

<400> SEQUENCE: 44
atccgaattc aggtggaggt tcgtgtttgt ggggtgcagt tagtgagctg gat 53

<210> SEQ ID NO 45
<211> LENGTH: 56
<212> TYPE: DNA
<213> ORGANISM: Artificial
<220> FEATURE:
<223> OTHER INFORMATION: Synthetic nucleotide

<400> SEQUENCE: 45
atccgaattc aggtggaggt tcgtgtttgt ggggtgatgc aagtgagctg gatttt 56

<210> SEQ ID NO 46
<211> LENGTH: 56
<212> TYPE: DNA
<213> ORGANISM: Artificial
<220> FEATURE:
<223> OTHER INFORMATION: Synthetic nucleotide

<400> SEQUENCE: 46
tcggccgcaa gcttttagct acacagaaaa tccagctctg caacatcacc ccacaa 56

<210> SEQ ID NO 47
<211> LENGTH: 53
<212> TYPE: DNA
<213> ORGANISM: Artificial
<220> FEATURE:
<223> OTHER INFORMATION: Synthetic nucleotide

<400> SEQUENCE: 47
tcggccgcaa gcttttagct acacagaaaa tccagtgcac taacatcacc cca 53

<210> SEQ ID NO 48
<211> LENGTH: 50
<212> TYPE: DNA
<213> ORGANISM: Artificial
<220> FEATURE:
<223> OTHER INFORMATION: Synthetic nucleotide

<400> SEQUENCE: 48
tcggccgcaa gcttttagct acacagaaaa tctgcctcac taacatcacc 50

<210> SEQ ID NO 49
<211> LENGTH: 47
<212> TYPE: DNA
<213> ORGANISM: Artificial
<220> FEATURE:
<223> OTHER INFORMATION: Synthetic nucleotide

<400> SEQUENCE: 49
tcggccgcaa gcttttagct acacagaaat gccagctcac taacatc 47

<210> SEQ ID NO 50
<211> LENGTH: 44
<212> TYPE: DNA
<213> ORGANISM: Artificial
<220> FEATURE:
<223> OTHER INFORMATION: Synthetic nucleotide

<400> SEQUENCE: 50
tcggccgcaa gcttttagct acacagtgca tccagctcac taac 44

<210> SEQ ID NO 51
<211> LENGTH: 41
<212> TYPE: DNA
<213> ORGANISM: Artificial
<220> FEATURE:
<223> OTHER INFORMATION: Synthetic nucleotide

<400> SEQUENCE: 51
tcggccgcaa gcttttagct acatgcaaaa tccagctcac t 41

<210> SEQ ID NO 52
<211> LENGTH: 38
<212> TYPE: DNA
<213> ORGANISM: Artificial
<220> FEATURE:
<223> OTHER INFORMATION: Synthetic nucleotide

<400> SEQUENCE: 52
tcggccgcaa gcttttagct tgccagaaaa tccagctc 38

<210> SEQ ID NO 53
<211> LENGTH: 35
<212> TYPE: DNA
<213> ORGANISM: Artificial
<220> FEATURE:
<223> OTHER INFORMATION: Synthetic nucleotide

<400> SEQUENCE: 53
tcggccgcaa gcttttatgc acacagaaaa tccag 35

<210> SEQ ID NO 54
<211> LENGTH: 79
<212> TYPE: DNA
<213> ORGANISM: Artificial
<220> FEATURE:
<223> OTHER INFORMATION: Synthetic peptide
<220> FEATURE:
<221> NAME/KEY: misc_feature
<222> LOCATION: (24)..(56)
<223> OTHER INFORMATION: n is a, c, g, or t

<400> SEQUENCE: 54
cgaattcagg tggaggttcg tgtnnnnnnn nnnnnnnnnn nnnnnnnnnn nnnnnntgta 60
gctaaaagct tgcggccga 79

<210> SEQ ID NO 55
<211> LENGTH: 79
<212> TYPE: DNA
<213> ORGANISM: Artificial
<220> FEATURE:
<223> OTHER INFORMATION: Synthetic peptide
<220> FEATURE:
<221> NAME/KEY: misc_feature
<222> LOCATION: (24)..(56)
<223> OTHER INFORMATION: n is a, c, g, or t

<400> SEQUENCE: 55
cgaattcagg tggaggttcg tgtnnnnnnn nnnnnnnnnn nnnnnnnnnn nnnnnntgta 60
gctaaaagct tgcggccga 79

<210> SEQ ID NO 56
<211> LENGTH: 11
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (1)..(1)
<223> OTHER INFORMATION: Xaa is Leu or Val
<220> FEATURE:
<221> NAME/KEY: misc_feature
<222> LOCATION: (2)..(2)
<223> OTHER INFORMATION: Xaa is Trp or Cys
<220> FEATURE:
<221> NAME/KEY: misc_feature
<222> LOCATION: (3)..(3)
<223> OTHER INFORMATION: Xaa is Gly or Arg
<220> FEATURE:
<221> NAME/KEY: misc_feature
<222> LOCATION: (4)..(4)
<223> OTHER INFORMATION: Xaa is Asp or Glu
<220> FEATURE:
<221> NAME/KEY: misc_feature
<222> LOCATION: (6)..(6)
<223> OTHER INFORMATION: Xaa is Ser, Asn, Lys, or Arg
<220> FEATURE:
<221> NAME/KEY: misc_feature
<222> LOCATION: (7)..(7)
<223> OTHER INFORMATION: Xaa is Asp or Glu
<220> FEATURE:
<221> NAME/KEY: misc_feature
<222> LOCATION: (8)..(8)
<223> OTHER INFORMATION: Xaa is Leu or Val
<220> FEATURE:
<221> NAME/KEY: misc_feature
<222> LOCATION: (9)..(9)
<223> OTHER INFORMATION: Xaa is Asp or Glu

```
<220> FEATURE:
<221> NAME/KEY: misc_feature
<222> LOCATION: (10)..(10)
<223> OTHER INFORMATION: Xaa is Phe, Leu, or Val
<220> FEATURE:
<221> NAME/KEY: misc_feature
<222> LOCATION: (11)..(11)
<223> OTHER INFORMATION: Xaa is Leu, Val, or Thr

<400> SEQUENCE: 56

Xaa Xaa Xaa Xaa Val Xaa Xaa Xaa Xaa Xaa Xaa
1               5                   10


<210> SEQ ID NO 57
<211> LENGTH: 13
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (2)..(2)
<223> OTHER INFORMATION: Xaa is Leu or Val
<220> FEATURE:
<221> NAME/KEY: misc_feature
<222> LOCATION: (3)..(3)
<223> OTHER INFORMATION: Xaa is Trp or Cys
<220> FEATURE:
<221> NAME/KEY: misc_feature
<222> LOCATION: (4)..(4)
<223> OTHER INFORMATION: Xaa is Gly or Arg
<220> FEATURE:
<221> NAME/KEY: misc_feature
<222> LOCATION: (5)..(5)
<223> OTHER INFORMATION: Xaa is Asp or Glu
<220> FEATURE:
<221> NAME/KEY: misc_feature
<222> LOCATION: (7)..(7)
<223> OTHER INFORMATION: Xaa is Ser, Asn, Lys, or Arg
<220> FEATURE:
<221> NAME/KEY: misc_feature
<222> LOCATION: (8)..(8)
<223> OTHER INFORMATION: Xaa is Asp or Glu
<220> FEATURE:
<221> NAME/KEY: misc_feature
<222> LOCATION: (9)..(9)
<223> OTHER INFORMATION: Xaa is Leu or Val
<220> FEATURE:
<221> NAME/KEY: misc_feature
<222> LOCATION: (10)..(10)
<223> OTHER INFORMATION: Xaa is Asp or Glu
<220> FEATURE:
<221> NAME/KEY: misc_feature
<222> LOCATION: (11)..(11)
<223> OTHER INFORMATION: Xaa is Phe, Leu, or Val
<220> FEATURE:
<221> NAME/KEY: misc_feature
<222> LOCATION: (12)..(12)
<223> OTHER INFORMATION: Xaa is Leu, Val, or Thr

<400> SEQUENCE: 57

Cys Xaa Xaa Xaa Xaa Val Xaa Xaa Xaa Xaa Xaa Xaa Cys
1               5                   10


<210> SEQ ID NO 58
<211> LENGTH: 15
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (3)..(3)
<223> OTHER INFORMATION: Xaa is Leu or Val
<220> FEATURE:
```

<221> NAME/KEY: misc_feature
<222> LOCATION: (4)..(4)
<223> OTHER INFORMATION: Xaa is Trp or Cys
<220> FEATURE:
<221> NAME/KEY: misc_feature
<222> LOCATION: (5)..(5)
<223> OTHER INFORMATION: Xaa is Gly or Arg
<220> FEATURE:
<221> NAME/KEY: misc_feature
<222> LOCATION: (6)..(6)
<223> OTHER INFORMATION: Xaa is Asp or Glu
<220> FEATURE:
<221> NAME/KEY: misc_feature
<222> LOCATION: (8)..(8)
<223> OTHER INFORMATION: Xaa is Ser, Asn, Lys, or Arg
<220> FEATURE:
<221> NAME/KEY: misc_feature
<222> LOCATION: (9)..(9)
<223> OTHER INFORMATION: Xaa is Asp or Glu
<220> FEATURE:
<221> NAME/KEY: misc_feature
<222> LOCATION: (10)..(10)
<223> OTHER INFORMATION: Xaa is Leu or Val
<220> FEATURE:
<221> NAME/KEY: misc_feature
<222> LOCATION: (11)..(11)
<223> OTHER INFORMATION: Xaa is Asp or Glu
<220> FEATURE:
<221> NAME/KEY: misc_feature
<222> LOCATION: (12)..(12)
<223> OTHER INFORMATION: Xaa is Phe, Leu, or Val
<220> FEATURE:
<221> NAME/KEY: misc_feature
<222> LOCATION: (13)..(13)
<223> OTHER INFORMATION: Xaa is Leu, Val, or Thr

<400> SEQUENCE: 58

Ser Cys Xaa Xaa Xaa Xaa Val Xaa Xaa Xaa Xaa Xaa Xaa Cys Ser
1               5                   10                  15

<210> SEQ ID NO 59
<211> LENGTH: 10
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (3)..(3)
<223> OTHER INFORMATION: Xaa is Pro or Ala
<220> FEATURE:
<221> NAME/KEY: misc_feature
<222> LOCATION: (4)..(4)
<223> OTHER INFORMATION: Xaa is Ser or Arg
<220> FEATURE:
<221> NAME/KEY: misc_feature
<222> LOCATION: (6)..(6)
<223> OTHER INFORMATION: Xaa is Ser, Gly, Thr, or Arg
<220> FEATURE:
<221> NAME/KEY: misc_feature
<222> LOCATION: (7)..(7)
<223> OTHER INFORMATION: Xaa is Asp or Glu
<220> FEATURE:
<221> NAME/KEY: misc_feature
<222> LOCATION: (8)..(8)
<223> OTHER INFORMATION: Xaa is Tyr or Asp
<220> FEATURE:
<221> NAME/KEY: misc_feature
<222> LOCATION: (9)..(9)
<223> OTHER INFORMATION: Xaa is Ala, Gly, Ser, or Thr
<220> FEATURE:
<221> NAME/KEY: misc_feature
<222> LOCATION: (10)..(10)
<223> OTHER INFORMATION: Xaa is Phe or Leu

<400> SEQUENCE: 59

```
Leu Tyr Xaa Xaa Trp Xaa Xaa Xaa Xaa Xaa
1               5                   10


<210> SEQ ID NO 60
<211> LENGTH: 12
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (4)..(4)
<223> OTHER INFORMATION: Xaa is Pro or Ala
<220> FEATURE:
<221> NAME/KEY: misc_feature
<222> LOCATION: (5)..(5)
<223> OTHER INFORMATION: Xaa is Ser or Arg
<220> FEATURE:
<221> NAME/KEY: misc_feature
<222> LOCATION: (7)..(7)
<223> OTHER INFORMATION: Xaa is Ser, Gly, Thr, or Arg
<220> FEATURE:
<221> NAME/KEY: misc_feature
<222> LOCATION: (8)..(8)
<223> OTHER INFORMATION: Xaa is Asp or Glu
<220> FEATURE:
<221> NAME/KEY: misc_feature
<222> LOCATION: (9)..(9)
<223> OTHER INFORMATION: Xaa is Tyr or Asp
<220> FEATURE:
<221> NAME/KEY: misc_feature
<222> LOCATION: (10)..(10)
<223> OTHER INFORMATION: Xaa is Ala, Gly, Ser, or Thr
<220> FEATURE:
<221> NAME/KEY: misc_feature
<222> LOCATION: (11)..(11)
<223> OTHER INFORMATION: Xaa is Phe or Leu

<400> SEQUENCE: 60

Cys Leu Tyr Xaa Xaa Trp Xaa Xaa Xaa Xaa Xaa Cys
1               5                   10


<210> SEQ ID NO 61
<211> LENGTH: 14
<212> TYPE: PRT
<213> ORGANISM: Artificial
<220> FEATURE:
<223> OTHER INFORMATION: Synthetic peptide
<220> FEATURE:
<221> NAME/KEY: misc_feature
<222> LOCATION: (5)..(5)
<223> OTHER INFORMATION: Xaa is Pro or Ala
<220> FEATURE:
<221> NAME/KEY: misc_feature
<222> LOCATION: (6)..(6)
<223> OTHER INFORMATION: Xaa is Ser or Arg
<220> FEATURE:
<221> NAME/KEY: misc_feature
<222> LOCATION: (8)..(8)
<223> OTHER INFORMATION: Xaa is Ser, Gly, Thr, or Arg
<220> FEATURE:
<221> NAME/KEY: misc_feature
<222> LOCATION: (9)..(9)
<223> OTHER INFORMATION: Xaa is Asp or Glu
<220> FEATURE:
<221> NAME/KEY: misc_feature
<222> LOCATION: (10)..(10)
<223> OTHER INFORMATION: Xaa is Tyr or Asp
<220> FEATURE:
<221> NAME/KEY: misc_feature
<222> LOCATION: (11)..(11)
<223> OTHER INFORMATION: Xaa is Ala, Gly, Ser, or Thr
<220> FEATURE:
<221> NAME/KEY: misc_feature
<222> LOCATION: (12)..(12)
<223> OTHER INFORMATION: Xaa is Phe or Leu
```

<400> SEQUENCE: 61

Ser Cys Leu Tyr Xaa Xaa Trp Xaa Xaa Xaa Xaa Xaa Cys Ser
1               5                   10

<210> SEQ ID NO 62
<211> LENGTH: 15
<212> TYPE: PRT
<213> ORGANISM: Artificial
<220> FEATURE:
<223> OTHER INFORMATION: Synthetic peptide

<400> SEQUENCE: 62

Ala Cys Leu Trp Gly Asp Val Ser Glu Leu Asp Phe Leu Cys Ser
1               5                   10                  15

<210> SEQ ID NO 63
<211> LENGTH: 15
<212> TYPE: PRT
<213> ORGANISM: Artificial
<220> FEATURE:
<223> OTHER INFORMATION: Synthetic peptide

<400> SEQUENCE: 63

Ser Ala Leu Trp Gly Asp Val Ser Glu Leu Asp Phe Leu Cys Ser
1               5                   10                  15

<210> SEQ ID NO 64
<211> LENGTH: 15
<212> TYPE: PRT
<213> ORGANISM: Artificial
<220> FEATURE:
<223> OTHER INFORMATION: Synthetic peptide

<400> SEQUENCE: 64

Ser Cys Ala Trp Gly Asp Val Ser Glu Leu Asp Phe Leu Cys Ser
1               5                   10                  15

<210> SEQ ID NO 65
<211> LENGTH: 15
<212> TYPE: PRT
<213> ORGANISM: Artificial
<220> FEATURE:
<223> OTHER INFORMATION: Synthetic peptide

<400> SEQUENCE: 65

Ser Cys Leu Ala Gly Asp Val Ser Glu Leu Asp Phe Leu Cys Ser
1               5                   10                  15

<210> SEQ ID NO 66
<211> LENGTH: 15
<212> TYPE: PRT
<213> ORGANISM: Artificial
<220> FEATURE:
<223> OTHER INFORMATION: Synthetic peptide

<400> SEQUENCE: 66

Ser Cys Leu Trp Ala Asp Val Ser Glu Leu Asp Phe Leu Cys Ser
1               5                   10                  15

<210> SEQ ID NO 67
<211> LENGTH: 15
<212> TYPE: PRT
<213> ORGANISM: Artificial
<220> FEATURE:
<223> OTHER INFORMATION: Synthetic peptide

<400> SEQUENCE: 67

Ser Cys Leu Trp Gly Ala Val Ser Glu Leu Asp Phe Leu Cys Ser
1 5 10 15

<210> SEQ ID NO 68
<211> LENGTH: 15
<212> TYPE: PRT
<213> ORGANISM: Artificial
<220> FEATURE:
<223> OTHER INFORMATION: Synthetic peptide

<400> SEQUENCE: 68

Ser Cys Leu Trp Gly Asp Ala Ser Glu Leu Asp Phe Leu Cys Ser
1 5 10 15

<210> SEQ ID NO 69
<211> LENGTH: 15
<212> TYPE: PRT
<213> ORGANISM: Artificial
<220> FEATURE:
<223> OTHER INFORMATION: Synthetic peptide

<400> SEQUENCE: 69

Ser Cys Leu Trp Gly Asp Val Ala Glu Leu Asp Phe Leu Cys Ser
1 5 10 15

<210> SEQ ID NO 70
<211> LENGTH: 15
<212> TYPE: PRT
<213> ORGANISM: Artificial
<220> FEATURE:
<223> OTHER INFORMATION: Synthetic peptide

<400> SEQUENCE: 70

Ser Cys Leu Trp Gly Asp Val Ser Ala Leu Asp Phe Leu Cys Ser
1 5 10 15

<210> SEQ ID NO 71
<211> LENGTH: 15
<212> TYPE: PRT
<213> ORGANISM: Artificial
<220> FEATURE:
<223> OTHER INFORMATION: Synthetic peptide

<400> SEQUENCE: 71

Ser Cys Leu Trp Gly Asp Val Ser Glu Ala Asp Phe Leu Cys Ser
1 5 10 15

<210> SEQ ID NO 72
<211> LENGTH: 15
<212> TYPE: PRT
<213> ORGANISM: Artificial
<220> FEATURE:
<223> OTHER INFORMATION: Synthetic peptide

<400> SEQUENCE: 72

Ser Cys Leu Trp Gly Asp Val Ser Glu Leu Ala Phe Leu Cys Ser
1 5 10 15

<210> SEQ ID NO 73
<211> LENGTH: 15
<212> TYPE: PRT
<213> ORGANISM: Artificial
<220> FEATURE:
<223> OTHER INFORMATION: Synthetic peptide

<400> SEQUENCE: 73

-continued

```
Ser Cys Leu Trp Gly Asp Val Ser Glu Leu Asp Ala Leu Cys Ser
1               5                   10                  15


<210> SEQ ID NO 74
<211> LENGTH: 15
<212> TYPE: PRT
<213> ORGANISM: Artificial
<220> FEATURE:
<223> OTHER INFORMATION: Synthetic peptide

<400> SEQUENCE: 74

Ser Cys Leu Trp Gly Asp Val Ser Glu Leu Asp Phe Ala Cys Ser
1               5                   10                  15


<210> SEQ ID NO 75
<211> LENGTH: 15
<212> TYPE: PRT
<213> ORGANISM: Artificial
<220> FEATURE:
<223> OTHER INFORMATION: Synthetic peptide

<400> SEQUENCE: 75

Ser Cys Leu Trp Gly Asp Val Ser Glu Leu Asp Phe Leu Ala Ser
1               5                   10                  15


<210> SEQ ID NO 76
<211> LENGTH: 15
<212> TYPE: PRT
<213> ORGANISM: Artificial
<220> FEATURE:
<223> OTHER INFORMATION: Synthetic peptide

<400> SEQUENCE: 76

Ser Cys Leu Trp Gly Asp Val Ser Glu Leu Asp Phe Leu Cys Ala
1               5                   10                  15
```

METHOD FOR SEPARATION OF RARE EARTH ION

TECHNICAL FIELD

The present specification relates to a method for separating a rare earth ion.

CROSS REFERENCE TO RELATED APPLICATIONS

This application is related to Japanese Patent Application No. 2014-256938 filed on Dec. 19, 2014 and claims priority to the Japanese application entire contents of which axe incorporated by reference herein.

DESCRIPTION OF RELATED ART

In recent years, exploitation of inorganic elements mainly including rare earths has been indispensable. Meanwhile the stable supply of ram earths and the environmental impact caused by the exploitation thereof also poses concerns. Therefore there is a need to develop techniques that allow effective collection of rare earths from nature and for the establishment of techniques that allow low-energy, selective and effective recovery and recycling of rate earths contained in a subtle amount in discarded products and waste water.

Methods for recovering rare earths reported are methods in which rare earth elements are recovered by solvent extraction utilizing N,N-dioctyldiglycol amic acid (DODGAA) and the like or by utilizing metal reducing microorganisms. Meanwhile peptides which hind to rare earth ions such as lanthanoid ion have been reported (U.S. Patent Application Publication No. 2003/0228622, Japanese Patent Application Publication No. 2014-51449).

BRIEF SUMMARY OF INVENTION

The methods utilizing solvent extraction and metal reducing microorganisms as described hereinabove are not always profitable in terms of the cost. In addition, in the methods disclosed in U.S. Patent Application Publication No. 2003/0228622 and Japanese Patent Application Publication No. 2014-51449, lanthanoid ions are captured as they are and it is still difficult to recover the lanthanoid ions.

Further, rare earth ions are naturally occurring as mixtures of multiple rare earth ions or mixtures with other metal ions, and thus it is still difficult to separate a specific rare earth ion from contaminated metal ions or to separate different rare earth ions one another.

The disclosure herein provides a method for identifying and separating a rare earth ion.

The inventors of the present invention searched for a peptide that allows capture or recovery of dysprosium oxide and neodymium oxide, and found that a rare earth ion may be mineralized to obtain a rare earth mineral (a hydroxide, etc.) which can then be separated and recovered as a precipitate. The inventors also found that in order to mineralize a particular rare earth ion, a structure suitable for mineralization of the rare earth ion exists. Based on such knowledge, the disclosure herein may provide the following.

(1) A method for separating a rare earth ion, the method comprising:

bringing one or more rare earth ions into contact with a mineralization agent capable of mineralizing the rare earth ions, wherein the one or more rare earth ions are separated as rare earth minerals, based on a mineralization tendency of the mineralization agent with respect to a rare earth ion series.

(2) The method according to (1), wherein the mineralization agent is capable of forming a cyclic structure when the mineralization agent is proximally positioned to the rare earth ion or has a cyclic structure.

(3) The method according to (1) or (2), wherein the rare earth mineralization agent comprises a peptide region.

(4) The method according to (3), wherein the peptide region comprises an amino acid sequence with 8 or more and 14 or less amino acid residues.

(5) The method according to (4), wherein the peptide region has cysteine residues as amino acid residues at both terminals and has an amino acid sequence comprising, other than the terminal amino acid residues at both terminals, 8 or more and 12 or less amino acid residues.

(6) The method according to any of (3) to (5), wherein the peptide region comprises one or more acidic amino acid residues.

(7) The method according to (6), wherein the peptide region comprises 2 or more acidic amino acid residues.

(8) The method according to (6) or (7), wherein the acidic amino acid residue is selected from glutamic acid and aspartic acid.

(9) The method according to any of (3) to (8), wherein the peptide region has any of the following amino acid sequences:

```
(i)
                                    (SEQ ID NO: 1)
-X1-X2-X3-A1-X4-X5-A2-X6-A3-X7-X8-
```

wherein A1 is an acidic amino acid, tyrosine, alanine, methionine or glycine; A2 is an acidic amino acid or leucine; A3 is an acidic amino acid, glycine, proline, glutamine or alanine; X1 is leucine, isoleucine, valine or threonine; X2 is tryptophan, cysteine, aspartic acid, glycine or valine; X3 is glycine, isoleucine, cysteine, serine or arginine; X4 is valine, serine, arginine, methionine, phenylalanine or leucine; X5 is serine, leucine, arginine, glycine, cysteine, asparagine or lysine; X6 is leucine, lysine, valine, serine or glycine; X7 is phenylalanine, glycine, leucine, threonine, isoleucine, valine, tryptophan or histidine; X8 is leucine, valine, threonine, serine, asparagine, phenylalanine or glutamic acid, provided that at least one acidic amino acid is included;

```
(ii)
                                    (SEQ ID NO: 2)
-X11-X12-X13-X14-X15-X16-A4-X17-X18-X19-
```

wherein A4 is an acidic amino acid; X11 is leucine, threonine, glutamic acid, isoleucine, valine, phenylalanine, cysteine or tyrosine; X12 is tyrosine, aspartic acid, asparagine, glutamic acid, arginine, phenylalanine or valine; X13 is proline, serine, glycine, leucine, alanine, threonine, valine or phenylalanine; X14 is serine, glutamic acid, arginine or isoleucine; X15 is tryptophan, alanine, glycine, cysteine, methionine or tyrosine; X16 is serine, glycine, threonine, alanine, arginine or cysteine; X17 is tyrosine, cysteine, serine, isoleucine, aspartic acid, serine, glycine, lysine or histidine; X18 is alanine, glycine, threonine, proline, cysteine or serine; and X19 is phenylalanine, arginine, valine, leucine, cysteine, alanine or serine; and (iii)

(SEQ ID NO: 3)
X21-X22-X23-X24-X25-A5-X26-X27-A6-X28-X29-X30 wherein A5 and A6 are independently an acidic amino acid; X21 is proline, X22 is valine; X23 is tryptophan; X24 is phenylalanine; X25 is serine; X26 is valine; X27 is glycine; X28 is phenylalanine; X29 is methionine and X30 is valine.

(10) The method according to any of (1) to (9), wherein one or more rare earth ions are separated as the rare earth minerals from a mixture of two or more rare earth ions.

(11) The method according to any of (1) to (10), wherein one or more light rare earth ions are separated.

(12) The method according to (11), wherein a neodymium ion is separated.

(13) The method according to any of (1) to (10), wherein one or more heavy rare earth ions are separated.

(14) The method according to (13), wherein a dysprosium ion is separated.

(15) The method according to any of (1) to (14), wherein one or more light rare earth ions are separated from one or more heavy rare earth ions.

(16) A method for detecting a rare earth ion, the method comprising:

bringing one or more rare earth ions into contact with a mineralization agent for mineralizing the rare earth ions, wherein one or more rare earth ions are separated as rare earth minerals, based on the mineralization tendency of the mineralization agent with respect to a rare earth ion series and the rare earth minerals or rare earth species in the rare earth minerals are detected.

BRIEF DESCRIPTION OF DRAWINGS

FIG. 3 illustrates the results of evaluation of binding ability to dysprosium oxide and neodymium oxide.

FIG. 9 illustrates amino acid sequences of alanine substituents of the Lamp-1 peptide.

FIG. 11 illustrates the results of amino acid sequence analysis of peptides screened from a partial mutant library of the Lamp-1 peptide using the binding ability to dysprosium oxide as an index.

FIG. 12 illustrates the results of amino acid sequence analysis of peptides screened from a partial mutant library of the Lamp-2 peptide using the binding ability to dysprosium oxide as an index.

DETAILED DESCRIPTION OF INVENTION

Figure 1:
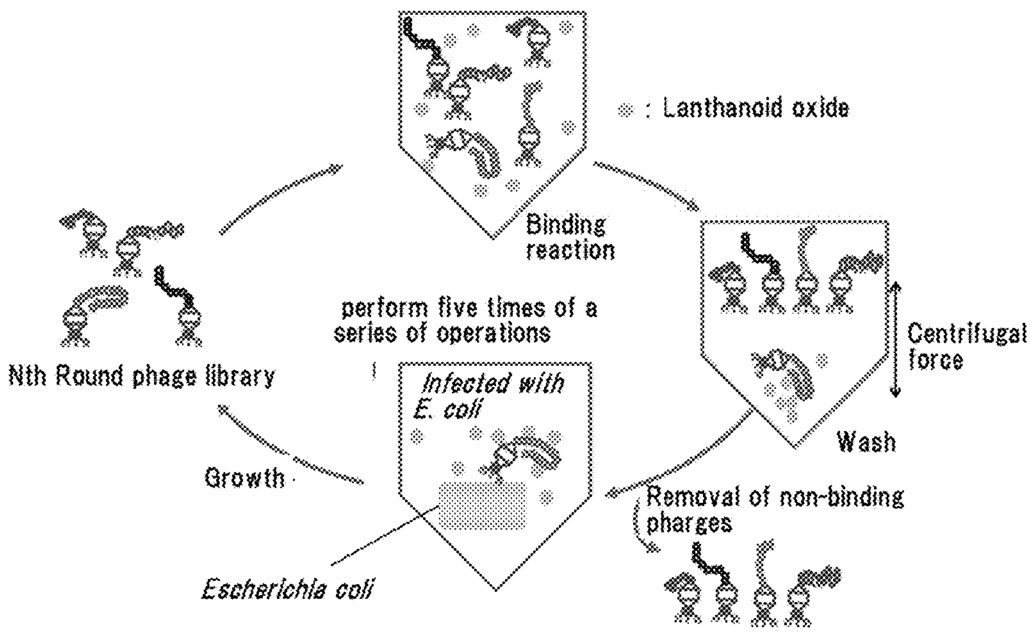
FIG. 1 illustrates an overview of biopanning by phage display.

The disclosure herein relates to a method for separating a rare earth ion. In the separation method of the present invention, a mineralization agent for mineralizing a rare earth is used. The mineralization agent has a rare earth mineralization ability (hereinafter merely referred to as mineralization ability) characteristic to the mineralization agent for each rare earth ion and mineralizes a rare earth to separate and recover the same.

The disclosure is further based on the fact that the mineralization agent has different mineralization abilities for various rare earth ions according to the size of the cyclic structures which may be formed by the mineralization agent.

As used herein, mineralization ability refers to an ability to capture a rare earth ion and mineralize the same to generate a hydroxide and the like. Mineralization of a rare earth is the phenomenon which is found by the inventors of the present invention for the first time. An ability to mineralize a rare earth is more specifically an ability of a mineralization agent to produce, in a liquid medium containing a rare earth ion, a rare earth mineral such as a hydroxide of the rare earth from the rare earth ion and a counter ion in the liquid medium.

As used herein, mineralization tendency refers to a combination of mineralization abilities for two or more rare earth ions belonging to the rare earth ion series. The mineralization tendency implies both the rare earth ion to which the agent exhibits the mineralization ability, i.e., the mineralization target, and the extent of mineralization of the mineralization target, the rare earth ion, i.e., the strength (liability) of mineralization.

According to the disclosure, mineralization agents may be provided that have different mineralization tendencies for 17 rare earth element ions from, for example, scandium (Sc) through lutetium (Lu) in the rare earth ion series.

Without being bound by theory, the inventors of the present invention assume that the difference in the mineralization ability and the mineralization tendency of mineralization agents for rare earth ion series is based on the relationship between the cyclic structures which may be formed by mineralization agents and the ionic radius, the enthalpy of hydration, the acid dissociation constant and the like of rare of rare earth ions.

For example, the mineralization agent exhibits a tendency such that a rare earth ion that can be mineralized by the agent is defined according to the cyclic structure which may be formed by the agent. For example, it is assumed that a mineralization agent having a large cyclic structure can mineralize a rare earth ion having an increased ionic radius, a mineralization agent having a small cyclic structure can mineralize a rare earth ion having a decreased ionic radius, and a mineralization agent having a smaller cyclic structure can mineralize a rare earth ion having a further decreased ionic radius.

According to the disclosure, by utilizing the mineralization tendency of the mineralization agent, one or more rare earth ions belonging to the rare earth ion series may be separated and detected as rare earth mineral(s).

Further, according to the disclosure, by utilizing the difference in the mineralization tendency of one or more mineralization agents, a rare earth ion(s) may be effectively separated and detected.

As used herein, "rare earth" includes both scandium (Sc) and yttrium (Y) as well as lanthanoid elements, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

As used herein, "rare earth ion" or "ion of rare earth" encompasses ions having valences equal to possible oxidation numbers of each rare earth. As used herein, "rare earth ion series" means a group of all 17 rare earth ions from scandium to lutetium.

As used herein, "rare earth mineral" encompasses oxides, hydroxides, inorganic acid salts and organic acid salts of respective rare earths having valences equal to possible oxidation numbers. A rare earth mineral produced by using a mineralization agent against a rare earth ion in an aqueous medium is typically a hydroxide.

As used herein, "light rare earth" includes scandium (Sc) as well as lanthanoid elements, lanthanum (La), cerium (Ce), praseodymium (Pr), neodymium (Nd), promethium (Pm), samarium (Sm), europium (Eu) and gadolinium (Gd) Neodymium is a useful material for magnets and the like. As used herein, "light rare earth ion series" means a group of ions of 9 light rare earths having valences equal to possible oxidation numbers thereof.

As used herein, "medium rare earth" includes samarium (Sm), europium (Eu) and gadolinium (Gd). As used herein, "medium rare earth ion series" means a group of ions of 3 medium rare earths having valences equal to possible oxidation numbers thereof.

As used herein, "heavy rare earth" includes terbium (Tb), dysprosium (Dy), holmium (Ho), erbium (Er), thulium (Tm), ytterbium (Yb) and lutetium (Lu). Dysprosium may be added to neodymium magnets to improve the performances thereof. As used herein, "heavy rare earth ion series" means a group of ions of 7 heavy rare earths having valences equal to possible oxidation numbers thereof.

As used herein, "rare earth species" includes rare earth ions and rare earth minerals.

The method for separating a rare earth ion of the disclosure is a method for separating a rare earth ion using the mineralization agent. Thus, the method may include a step of bringing one or more rare earth ions into contact with the mineralization agent. The mineralization agent is hereinafter described.

(Mineralization Agent)

The mineralization agent has mineralization agent has mineralization ability to mineralize one or more rare earth ions.

The mineralization agent may exhibit various mineralization tendencies for the rare earth ion series. As described, the mineralization tendency may be defined as the mineralization ability for a rare earth ion belonging to the rare earth ion series.

An aspect of the mineralization tendency is, for example, selective mineralization of certain rare earth ion(s) belonging to the rare earth ion, series, i.e. a selective mineralization tendency. For example, the aspect may include the tendency of mineralization ability for the heavy rare earth ion series among the rare earth ion series. The aspect may also include the tendency of high mineralization ability for certain heavy rare earth ion(s) among the heavy rare earth ion series. The aspect may also include the tendency of mineralization ability for almost the whole of the rare earth ion series.

The mineralization tendency of the mineralization agent may be appropriately selected according to the target rare earth ion to be separated, identified and the like or the rare earth ions which may be contained in a mixture of rare earth ions to which the mineralization agent is applied.

The mineralization agents having various mineralization tendencies may be obtained according to the capability to capture a rare earth mineral such as rare earth oxide. The mineralization agents having various mineralization tendencies may be alternatively obtained according to the mineralization ability for rare earth ions. The rare earth mineral capturing capability and screening of a mineralization agent based on the mineralization ability for a rare earth ion are described hereinafter.

(Mineralizing Region)

The mineralization agent may form a cyclic structure when the agent is proximally positioned to a rare earth ion or have a cyclic structure. It is assumed that the region of the cyclic structure which may be formed by the mineralization agent is involved in the mineralization ability. The region relevant to the cyclic structure is hereinafter also referred to as mineralizing region. A compound that can form such a mineralizing region includes polymers having multiple units linked through rotatable bonds.

The mineralizing region is formed as, for example, a peptide chain. A peptide chain which is formed with amino acids linked via peptide bonds may have variable bond angles ($\varphi$, $\Psi$) depending on side chains and interactions with surroundings, may have various conformations and may have controlled sizes of cyclic structures depending on the number of amino acid residues and the like.

As used herein, a peptide refers generally to a polymer of more than several natural amino acids and/or non-natural amino acids linked via acid amide bonds. A peptide generally has 100 or less amino acid residues. The peptide is preferably a polymer of L-amino acid residues, however, a polymer of D-amino acids is not excluded.

When the mineralizing region is a peptide chain, the mineralizing region may be linear or cyclic due to intramolecular disulfide bonds and the like. The cyclic mineralizing region may more effectively exhibit the mineralization ability.

Forming the mineralizing region with a peptide chain is advantageous in terms of the following points. Namely, a peptide chain having a linear primary structure may form a cyclic secondary structure (although a ring is not closed with a covalent bond). In addition, a peptide chain may form a disulfide bond by using S (sulfur atoms) in S-containing amino acid residues such as cysteine, and thus may be cyclized at a predetermined position and may easily form a closed cyclic structure. Further, by appropriately changing the number of residues and amino acid residues in a peptide, the mineralizing region can be constructed that may form a cyclic structure having a desired inner diameter and exhibiting a desired mineralization tendency.

The mineralizing region may be readily cyclized using cysteine residues by adding to a peptide containing cysteine residues an oxidizing agent such as iodine or hydrogen peroxide.

(Mineralization Sequence)

The mineralizing region formed of a peptide chain may be provided with an amino acid sequence (mineralization sequence) with 8 or more and 14 or less amino acid residues for exhibiting mineralization ability. The mineralizing region with such a number of residues allows one to design mineralization agents having various mineralization tendencies for the rare earth ion series. When the number of residues is less than 8, it is difficult to form an effective cyclic structure and when the number is more than 14, selective mineralization ability towards the rare earth ion series is decreased while exhibiting mineralization ability towards other ions.

The mineralizing region may partially include a mineralization sequence or may consist essentially of a mineralization sequence. More preferably, the mineralization sequence includes 10 or more and 14 or less amino acid residues.

In the light of formation of a cyclic structure, it is preferable that the mineralization sequence has cysteine residues at both terminals. In case of, for example, a mineralization sequence consisting of 10 or more and 14 or less amino acid residues which has cysteine residues at both terminals, the amino acid sequence between terminal cysteine residues consists of 8 or more and 12 or less amino acid residues.

The mineralization sequence preferably includes one or more acidic amino acid residues. Acidic amino acid residues include glutamic acid, aspartic acid, isoaspartic acid, isoglutamic acid, 2-aminoadipic acid, 2-aminosuberic acid and the like, among which aspartic acid and glutamic acid are preferred. Two or more acidic amino acid residues may be the same or different. The mineralization sequence may include 1 to 3 acidic amino acid residues or 3 or more acidic amino acid residues.

When the mineralization sequence includes two or more acidic amino acid residues, the acidic amino acid residues in the closest vicinity may be directly adjacent to each other or may be intervened by 1 or 2 to 4 amino acid residues. The intervening amino acid residue is not particularly limited and is preferably a neutral amino acid residue, an aromatic amino acid residue and the like. The intervening amino acid residue more preferably includes a neutral amino acid residue.

The neutral amino acid residue as used herein includes glycine, alanine, valine, leucine, isoleucine, serine, threonine and norvaline. A basic amino acid residue includes lysine, arginine, ornithine, norleucine, 2-aminobutanoic acid, 2,4-diaminobutanoic acid, 2,3-diaminopropionic acid, methionine, o-methylserine, t-butylglycine, t-butylalanine and cyclohexylalanine. An acid amide amino acid residue includes asparagine and glutamine. A cyclic amino acid residue includes proline, 3-hydroxyproline and 4-hydroxyproline. An OH-containing amino acid residue includes serine, threonine and homoserine. The aromatic amino acid residue includes phenylalanine, tyrosine and tryptophan.

A mineralization sequence having cysteines at both terminals of an amino acid sequence with 10 amino acid residues may form a cyclic structure having an inner diameter of about 1.31 nm by an S—S bond between terminal cysteines. The mineralization agent having such a mineralizing region may have a mineralization tendency with high mineralization ability for Yb and Lu, which have highest atomic numbers among the rare earth ion series as described herein.

A mineralizing region having cysteines at both terminals of an amino acid sequence with 1 amino acid residues may form a cyclic structure having an inner diameter of about 1.50 n by an S—S bond between terminal cysteines. The mineralization agent having such a mineralizing region may have a mineralization tendency with high mineralization ability for the heavy rare earth ion series as described herein.

Further, a mineralizing region having cysteines at both terminals of an amino acid sequence with 12 amino acid residues may form a cyclic structure having an inner diameter of about 1.58 in by an S—S bond between terminal cysteines. The mineralization agent having such a mineralizing region may have a mineralization tendency with high mineralization ability for the whole rare earth ion series as described herein.

The mineralizing region mineralizes a rare earth ion in an aqueous medium by non-covalent interaction with the rare earth ion. Upon mineralization, it is believed that the mineralizing region forms at least transiently a complex with the rare earth ion to the extent that the rare earth ion is captured. The non-covalent interaction includes electrostatic bonding, ion bonding, hydrogen bonding and the like. The interaction in relation to "capturing" as used herein is, however, not limited the foregoing.

The mineralizing region of the mineralization agent may mineralize at least one rare earth ion. However, as described hereinabove, the mineralization agent may mineralize 2 or more, 3 or more, 4 or more or 5 or more rare earth ions.

The mineralizing region may have a capability to capture a rare earth mineral. Mineralization ability allows production of a rare earth mineral such as a hydroxide of rare earth from a liquid medium containing a rare earth ion. Therefore, ionized rare earth may be separated and subsequently a rare earth mineral may be produced from the ion, facilitating separation and recovery and contributing to efficient separation and recovery of rare earth species. The mineralizing region may have a capability to capture a rare earth mineral such as an oxide of rare earth.

The mineralization sequence formed of a peptide chain may be provided with an amino acid sequence for example including any of the following (1) to (3):

```
(1)
                                    (SEQ ID NO: 1)
-X1-X2-X3-A1-X4-X5-A2-X6-A3-X7-X8-
```

wherein A1 is an acidic amino acid, tyrosine, alanine, methionine or glycine; A2 is an acidic amino acid or leucine; A3 is an acidic amino acid, glycine, proline, glutamine or alanine; X1 is leucine, isoleucine, valine or threonine; X2 is tryptophan, cysteine, aspartic acid, glycine or valine; X3 is glycine, isoleucine, cysteine, serine or arginine; X4 is valine, serine, arginine, methionine, phenylalanine or leucine; X5 is serine, leucine, arginine, glycine, cysteine, asparagine or lysine; X6 is leucine, lysine, valine, serine or glycine; X7 is phenylalanine, glycine, leucine, threonine, isoleucine, valine, tryptophan or histidine; X8 is leucine, valine, threonine, serine, asparagine, phenylalanine or glutamic acid provided that at least one acidic amino acid is included.

The mineralization sequence (1) has a mineralization tendency as follows. Namely, the mineralization ability for the light rare earth ion series is relatively low, and thus the mineralization sequence (1) may be unsuitable to mineralize the light rare earth ions into hydroxides and the like and capture the same. Thus, the mineralization sequence (1) has high mineralization ability for the heavy rare earth ion series of yttrium and from terbium to lutetium, low mineralization ability for the light rare earth ion series from lanthanum to gadolinium and a mineralization ability for the medium rare earth ion series from samarium to gadolinium, although the ability is lower than that for the heavy rare earth ion series.

```
(2)
                                    (SEQ ID NO: 2)
-X11-X12-X13-X14-X15-X16-A4-X17-X18-X19-
```

wherein A4 is an acidic amino acid; X11 is leucine, threonine, glutamic acid, isoleucine, valine, phenylalanine, cysteine or tyrosine; X12 is tyrosine, aspartic acid, asparagine, glutamic acid, arginine, phenylalanine or valine; X13 is proline, serine, glycine, leucine, alanine, threonine, valine or phenylalanine; X14 is serine, glutamic acid, arginine or isoleucine; X15 is tryptophan, alanine glycine, cysteine, methionine or tyrosine; X16 is serine, glycine, threonine, alanine, arginine or cysteine; X17 is tyrosine, cysteine, serine, isoleucine, aspartic acid, serine, glycine, lysine or histidine; X18 is alanine, glycine, threonine, proline, cysteine or serine; and X19 is phenylalanine, arginine, valine, leucine, cysteine, alanine or serine.

The mineralization sequence (2) has a mineralization tendency as follows. Namely, the mineralization sequence (2) has relatively low or no mineralization ability for the light rare earth ion series and thus may be extremely unsuitable for mineralization of the light rare earth ion series. The mineralization sequence (2) also has low mineralization ability for the heavy rare earth ion from terbium to erbium. On the other hand, the mineralization sequence (2) exhibits high mineralization ability for ytterbium in the heavy rare earth ion series and lutetium heavy rare earth ion.

```
(3)
                                    (SEQ ID NO: 3)
X21-X22-X23-X24-X25-A5-X26-X27-A6-X28-X29-X30
```

wherein A5 and A6 are independently an acidic amino acid; X21 is proline, X22 is valine; X23 is tryptophan; X24 is phenylalanine; X25 is serine; X26 is valine; X27 is glycine; X28 is phenylalanine; X29 is methionine and X30 is valine.

The mineralization sequence (3) has mineralization ability for a wide range of rare earth ions from light rare earth ion series to heavy rare earth ion series.

The mineralization sequence (3) also has rare earth species capturing capability for light rare earths including lanthanoid, lanthanum (La), cerium (Ce), praseodymium (Pr), neodymium (Nd), promethium (Pm), samarium (Sm) and europium (Eu), and has capturing capability for rare earth species, among others, of lanthanum, neodymium and samarium. The mineralization sequence (3) has rare earth mineral capturing capability and rare earth ion capturing capability for light rare earth species, and particularly mineralization ability for light rare earth species.

In the mineralization sequence (1), X1 is preferably leucine, isoleucine or valine; X2 is preferably tryptophan or cysteine; X3 is preferably glycine; A1 is preferably aspartic acid or glutamic acid; X4 is preferably valine; A2 is preferably glutamic acid or aspartic acid; X5 is preferably serine, arginine, asparagine or lysine; X6 is preferably leucine or valine; X7 is preferably phenylalanine or leucine; and X8 is preferably leucine, valine or threonine.

In the mineralization sequence (2), X11 is preferably leucine, isoleucine, valine or threonine; X12 is preferably tyrosine, asparagine, aspartic acid, arginine or glutamic acid; X13 is preferably proline, alanine, serine or glycine; X14 is preferably serine, arginine or isoleucine; X15 is preferably tryptophan; X16 is preferably seine, glycine or threonine; X17 is preferably tyrosine, aspartic acid or serine; X18 is alanine, threonine or glycine; and X19 is preferably phenylalanine or leucine.

The mineralization sequence (1) is preferably represented by Leu/Val-Trp/Cys-Gly/Arg-Asp/Glu-Val-Ser/Asn/Lys/Arg-Asp/Glu-Leu/Val-Asp/Glu-Phe/Leu/Val-Leu/Val/Thr (SEQ ID NO: 56), more preferably by Cys-Leu/Val-Trp/Cys-Gly/Arg-Asp/Glu-Val-Ser/Asn/Lys/Arg-Asp/Glu-Leu/Val-Asp/Glu-Phe/Leu/Val-Leu/Val/Thr-Cys (SEQ ID NO: 57), and still more preferably by Ser-Cys-Leu/Val-Trp/Cys-Gly/Arg-Asp/Glu-Val-Ser/Asn/Lys/Arg-Asp/Glu-Leu/Val-Asp/Glu-Phe/Leu/Val-Leu/Val/Thr-Cys-Ser (SEQ ID NO: 58).

The mineralization sequence (2) is preferably represented by Leu-Tyr-Pro/Ala-Ser/Arg-Trp-Ser/Gly/Thr/Arg-Asp/Glu-Tyr/Asp-Ala/Gly/Ser/Thr-Phe/Leu (SEQ ID NO: 59), more preferably by Cys-Leu-Tyr-Pro/Ala-Ser/Arg-Trp-Ser/Gly/Thr/Arg-Asp/Glu-Tyr/Asp-Ala/Gly/Ser/Thr-Phe/Leu-Cys (SEQ ID NO: 60), and still more preferably by Ser-Cys-Leu-Tyr-Pro/Ala-Ser/Arg-Trp-Ser/Gly/Thr/Arg-Asp/Glu-Tyr/Asp-Ala/Gly/Ser/Thr-Phe/Leu-Cys-Ser (SEQ ID NO: 61).

The mineralization sequence (3) may be more specifically Pro-Val-Trp-Phe-Ser-Asp/Glu-Val-Gly-Asp/Glu-Phe-Met-Val (SEQ ID NO: 3).

The mineralization sequence may further include one or more additional amino acids at the N-terminal or C-terminal of the sequence. For example, 1 or 2 amino acids may be added, 1 or more and 3 or less amino acids may be added, 1 or more and 5 or less amino acids may be added, 1 or more and 7 or less amino acids may be added, 1 or more and 9 or less amino acids may be added and 1 or more and 10 or less amino acids may be added.

Examples of an amino acid which may be added to a terminal of the mineralization sequence include serine, cysteine, asparagine and the like. By introducing cysteine at both terminals, the mineralizing region may be readily cyclized.

Examples of the mineralization sequence (1) include the following. In each of the amino acid sequences described below, the mineralization sequence is preferably the one from which one amino acid residue at both N-terminal and C-terminal is removed, more preferably the one from which two amino acid residues, i.e. SC- and -CS, at both terminals are removed, and still more preferably the one from which 1 amino acid (S) at both terminals is removed.

```
                                    (SEQ ID NO: 4)
SerCys-LeuTrpGlyAspValSerGluLeuAspPheLeu-CysSer

                                    (SEQ ID NO: 5)
SerCys-LeuTrpIleGluSerLeuAspLeuAspGlyLeu-CysSer

                                    (SEQ ID NO: 6)
SerCys-LeuCysCysGluValSerAspLeuGlyLeuVal-CysSer

                                    (SEQ ID NO: 7)
SerCys-ValCysIleGluArgArgGluLeuAspLeuLeu-CysSer

                                    (SEQ ID NO: 8)
SerCys-IleAspSerTyrValGlyGluLeuGluThrLeu-CysSer
```

-continued

```
                                         (SEQ ID NO: 9)
SerCys-LeuTrpArgAlaValCysAspLeuGlyIleGlu-CysSer

                                        (SEQ ID NO: 10)
SerCys-LeuGlyGlyAspMetSerAspLysProValSer-CysSer

                                        (SEQ ID NO: 11)
SerCys-ThrCysGlyMetValAsnAspValAspLeuThr-CysSer

                                        (SEQ ID NO: 12)
SerCys-IleValGlyGluValArgLeuSerAspLeuVal-CysSer

                                        (SEQ ID NO: 13)
SerCys-ThrCysGlyMetValAsnAspValAspLeuThr-CysSer

                                        (SEQ ID NO: 14)
SerCys-ValTrpArgGlyPheLysAspGlyGlnTrpPhe-CysSer

                                        (SEQ ID NO: 15)
SerCys-ValCysArgGlyLeuArgAspLeuAlaHisAsn-CysSer
```

Examples of the mineralization sequence (2) include the following. In each of the amino acid sequences described below, the mineralization sequence is preferably the one from which 3 amino acid residues at the N-terminal and 2 amino acid residues at the C-terminal are removed, more preferably the one from which SC- and -CS at both terminals are removed, and still more preferably the one from which 1 amino acid (S) at both terminals is removed.

```
                                        (SEQ ID NO: 16)
SerCys-LeuTyrProSerTrpSerAspTyrAlaPhe-CysSer

                                        (SEQ ID NO: 17)
SerCys-ThrAspProSerTrpGlyGluTyrGlyPhe-CysSer

                                        (SEQ ID NO: 18)
SerCys-GluTyrSerSerAlaSerGluTyrAlaArg-CysSer

                                        (SEQ ID NO: 19)
SerCys-IleTyrGlyGluTrpArgAspTyrAlaPhe-CysSer

                                        (SEQ ID NO: 20)
SerCys-ValTyrLeuSerGlySerGluCysThrPhe-CysSer

                                        (SEQ ID NO: 21)
SerCys-LeuAsnAlaArgTrpSerAspSerProVal-CysSer

                                        (SEQ ID NO: 22)
SerCys-LeuAsnThrIleTrpAlaAspTyrGlyLeu-CysSer

                                        (SEQ ID NO: 23)
SerCys-LysAspValSerTrpGlyAspIleAlaCys-CysSer

                                        (SEQ ID NO: 24)
SerCys-PheGluPheSerTrpSerGluAspCysAla-CysSer

                                        (SEQ ID NO: 25)
SerCys-GluArgGlySerTrpCysGluAspAlaCys-CysSer

                                        (SEQ ID NO: 26)
SetCys-ValTyrThrGlyTrpArgGluAspAlaSer-CysSer

                                        (SEQ ID NO: 27)
SerCys-CysPheAlaSerCysThrAspSerAlaLeu-CysSer

                                        (SEQ ID NO: 28)
SerCys-ThrArgSerArgCysGlyAspGlyAlaPhe-CysSer

                                        (SEQ ID NO: 29)
SerCys-TyrValAlaIleMetSerGluLysSerPhe-CysSer

                                        (SEQ ID NO: 30)
SerCys-IleGluAlaArgTyrThrAspHisAlaLeu-CysSer
```

Examples of the mineralization sequence (3) include the following. In each of the amino acid sequences described below, the mineralization sequence is preferably the one from which 3 amino acid residues at the N-terminal and 2 amino acid residues at the C-terminal are removed, more preferably the one from which SC- and -CS at both terminals are removed, and still more preferably the one from which 1 amino acid (S) at both terminals is removed.

```
                                        (SEQ ID NO: 31)
SerCys-Pro-Val-Trp-Phe-Ser-Asp-Val-Gly-Asp-Phe-
Met-Val-CysSer

                                        (SEQ ID NO: 32)
SerCys-Pro-Val-Trp-Phe-Ser-Asp-Val-Gly-Glu-Phe-
Met-Val-CysSer

                                        (SEQ ID NO: 33)
SerCys-Pro-Val-Trp-Phe-Ser-Glu-Val-Gly-Asp-Phe-
Met-Val-CysSer

                                        (SEQ ID NO: 34)
SerCys-Pro-Val-Trp-Phe-Ser-Glu-Val-Gly-Glu-Phe-
Met-Val-CysSer
```

The mineralization agent which is a peptide as a whole may be obtained by any methods well known to a person skilled in the art including well known chemical synthesis methods as well as genetic engineering methods.

The mineralization agent may include a label substance. Inclusion of a label substance facilitates identification of the mineralization agent mineralizing a rare earth ion, and thus is convenient for separation and recovery. A label substance is not particularly limited and may be any well-known label substance. A label substance may be visibly distinguishable or may emit light by irradiation of light having certain wavelength. A label substance may be colored per se or may generate color by reaction with another compound. A label substance may be supported on a carrier such as a bead. Examples of such a label substance include a colored bead, gold colloid, a fluorescence compound, an enzyme protein and the like. A label substance encompasses a label-binding substance such as those utilizing antibody-antibody reaction and those utilizing biotin-avidin interaction. A label-binding substance is a substance binding to a label substance and can also serve as a label substance.

A label substance is attached according to any well-known methods depending on the mineralization agent. When the mineralization agent is a peptide, a label substance is typically attached to the mineralization agent at the N-terminal and/or C-terminal of the mineralizing region via an appropriate number of linker peptides.

The mineralization agent may include a tag so that the mineralization agent can be recovered by affinity chromatography and the like. A tag may be an antigen (epitope) and the like or may be a well-known His-tag, biotin or the like. A tag may be attached via an appropriate linker.

By obtaining and using an antibody directed against the mineralization agent, the mineralization agent can be identified and detected without labeling.

(Screening and Production of Mineralization Agent)

The mineralization agent including a mineralizing region formed of a peptide may be obtained according to the following method. Namely, the mineralization agent having a desired selectivity may be obtained using various peptide libraries in phage display method against rare earth ions and rare earth minerals which are sought to be captured as targets.

Upon screening the mineralization agent, the capturing capability for a rare earth mineral such as an oxide of a particular rare earth may be used as an index, or the mineralization ability for a rare earth ion may be used as an index. In addition to using the mineralization ability for a rare earth ion as an index, using the capturing capability for a rare earth mineral as an index also allows screening of a peptide having mineralization ability for a rare earth ion. This is because, as described hereinabove, the mineralization sequence has a capability to capture a rare earth mineral. Hereinafter the capturing capability for a rare earth mineral and the mineralization ability for a rare earth ion are collectively referred to as the capturing capability for a rare earth species (rare earth species capturing capability).

In order to obtain the mineralization agent, a step may be included in which a rare earth species, which is a rare earth ion or a rare earth mineral, is brought into contact with one or more test peptides and the capturing capability of the one or more peptides for the rare earth species is to be evaluated. According to the screening method, a peptide having a mineralization ability for a rare earth species may be screened. In other words, a mineralization sequence may be screened or identified.

The rare earth species includes a rare earth ion and a rare earth mineral as described hereinabove. The species may be independently a screening target. The rare earth ion may be in solution of a nitrate salt, hydrochloride and the like. The rare earth mineral may be in dispersion.

The test peptide may include, without limitation, natural amino acid residues and/or artificial amino acid residue. The amino acid sequence of the test peptide may also be natural or artificial. The length of the peptide is not particularly limited. The length may be, as described hereinabove, generally 100 or less amino acid residues, typically preferably 5 or more, more preferably 7 or more and still more preferably 8 or more amino acid residues. The length may be 25 or less, 20 or less or 15 or less amino acid residues. The test peptide may be linear or a cyclic peptide. The cyclic peptide may be formed by a disulfide bond between two or more cysteine residues.

The test peptide may be designed, as described hereinabove, by taking the optimal number of amino acid residues, the presence of an acidic amino acid residue and the position of a cysteine residue and the like into account.

The test peptide may be a natural L-form polymer or a non-natural D-form polymer. The test peptide may include an artificial amino acid residue.

The test peptide may be obtained and screened by methods in which various peptides are displayed such as phage display, ribosome display, in vitro virus and the like, by chemical synthesis or genetic engineering synthesis including cell-free protein synthesis and the like. The test peptide may belong to a mutant library prepared on the basis of a certain amino acid sequence by a well-known method. Further, the test peptide may be supported on a solid phase carrier or a biological carrier.

The test peptide may be attached to a label substance or a tag so as to be convenient for evaluation of the capturing capability of a rare earth species. When an amino acid sequence of a test peptide is known, an antibody specifically binding to the test peptide may be prepared beforehand. Using the test peptide having such an additive is suitable for secondary screening for further evaluating the capturing capability of the rare earth species.

As described hereinbelow, a test peptide may be brought into contact with a rare earth species while denaturation of the test peptide is suppressed. Typically, a test peptide is brought into contact with a rare earth species in a liquid medium such as an aqueous medium satisfying the mineralization condition described hereinbelow.

The mode of contact between one or more rare earth species and a test peptide is not particularly limited. Particularly in a secondary screening for evaluating the capturing capability for the rare earth species with high accuracy, a rare earth species-immobilized solid phase carrier may be used for example including an array of the rare earth species immobilized on a solid phase carrier. By using such a rare earth species-immobilized solid phase carrier, more than one rare earth species and more than one test peptide can be collectively evaluated for the capturing capability. The rare earth species-immobilized solid phase carrier may be, for example, a sheet (plate)-shaped solid phase carrier including wells in which a rare earth species is immobilized. A rare earth species may be fixed by supplying a dispersion of the rare earth species to a surface such as glass or plastics and drying the same under vacuum, for example.

A complex resulting from capturing of the rare earth species by the test peptide after contact between the rare earth species and the test peptide is then recovered. The complex may be identified and recovered using the peptide per se, a phage displaying the peptide or through the label substance attached thereto. When an array on which the rare earth species is immobilized is used, the array may be washed to separate the unbound test peptide and maintain the complex on the array.

Upon recovery of the complex, the complex may be purified as a precipitate by a separation method, such as centrifugation, utilizing the difference in mass between the complex and the rare earth species and test peptide not forming the complex and thus has a lower mass than the complex and is to be removed as a supernatant.

Upon recovery of the complex, the recovered complex may be further added with a surfactant solution to eliminate a weak or non-specific capture of the rare earth species by the test peptide, followed by centrifugation to remove a supernatant containing the rare earth species and the test peptide. Thereby a complex may be selected and recovered in which the test peptide captures the rare earth species with stronger and/or higher specificity.

By carrying out such a washing step, a test peptide can be screened that strongly and/or specifically captures the rare earth species with high accuracy. By repeating the screening combined with such a washing step, the test peptide may be concentrated relative to the rare earth species and thus the test peptide may be screened that has stranger and/or more specific capturing capability for the rare earth species. It is preferable to repeat the set of screenings 3 or more times, more preferably 4 or more times, still more preferably 5 or more times and yet more preferably 6 or more times. The effect of washing can be generally seen up to around 10 times.

The rare earth species capturing capability is evaluated by identifying the complex or the test peptide in the complex and by measuring the amount of the rare earth species captured. The amount of the rare earth species captured is measured according to the turbidity due to the rare earth mineral or a quantification method suitable for the rare earth species. Accordingly, a test peptide having a capturing capability for a rare earth species of interest may be screened. When an amino acid sequence of the test peptide is known, the capturing capability for the ion species of interest is recognized and the amino acid sequence may be identified or screened as a capturing sequence. When the amino acid sequence of the test peptide is unknown such as when the test peptide is obtained by phage display, the test peptide may be sequenced, and then identified or screened by recognizing the capturing capability for the ion species targeting the amino acid sequence.

For example, a test peptide may be screened that has high capturing capability for a rare earth mineral such as an oxide of rare earth using the rare earth mineral as the rare earth species. The screened test peptide may have, in addition to the rare earth mineral capturing capability, a mineralization ability of the rare earth ion, i.e. may contain a mineralization sequence.

A rare earth ion of interest may be brought into contact with a test peptide to screen a test peptide having a candidate mineralization sequence by directly using the mineralization ability for the rare earth ion as an index.

The screening method as described hereinabove may be carried out as, for example, primary screening for a specific rare earth species. The primary screening is preferably carried out by phage display or the like in which test peptides having various amino acid sequences may be used. It is also preferable to include repetition of the set of washing procedures described hereinabove (corresponding to panning described hereinbelow in Examples).

The screening method is also effective as secondary screening for test peptides of which rare earth species capturing capability has been confirmed in the primary screening or mutants thereof. In a secondary screening for evaluating the capturing capability for a specific rare earth species or more than one rare earth species, it is useful for accurate evaluation to use a solid phase carrier (array, etc.) including a rare earth species of interest immobilized on the solid phase carrier or the like.

According to the present screening method, a mineralization agent may be obtained that has intended mineralization tendency for a rare earth ion series. Namely, a mineralization sequence may be identified and screened that has capturing capability for a specific rare earth species or more than one rare earth species. In addition, a mineralization sequence may be identified and screened that has strong and/or specific mineralization ability for a specific rare earth species.

The screening method of the mineralization agent has been described hereinabove. The screening method may be also performed as a method for producing the mineralization agent. For example, the mineralization agent may be produced by producing, in a chemical or genetic engineering manner, the peptide having a specific mineralization tendency as described hereinabove.

(Separation of Rare Earth Ion)

Separation or identification of a rare earth ion with the mineralization agent may include the step of bringing one or more rare earth ions into contact with the mineralization agent. Due to the mineralization tendency of the mineralization agent, the one or more rare earth ions may be mineralized and the one or more rare earth ions may be separated as rare earth minerals.

The conditions for production of a rare earth mineral from a rare earth ion with the mineralization agent is not particularly limited as far as the mineralization ability of the mineralization agent can be exhibited under the conditions. The separation target and the rare earth ion may be contacted under appropriate conditions and incubated, if necessary.

For mineralization of a rare earth ion with the mineralization agent, it is required to provide a rare earth ion for generation of a rare earth mineral and an anion such as an inorganic acid ion or a hydroxide ion for forming a mineral with the rare earth ion (they may be collectively referred to as mineralization raw materials). Among the anions, the inorganic acid ion may be present in a liquid medium for mineralization by adding an acid or a salt thereto. The hydroxide ion may be included in a liquid medium including water by dissociation of water.

The mineralization conditions may be determined by varying pH, temperature and salt concentration of a liquid medium while bringing a separation target and the mineralization agent into contact and confirming generation of a rare earth mineral from a rare earth ion with the mineralization agent.

The liquid medium, for example, may be any liquid medium as far as it allows exhibition of mineralization ability of the mineralization agent. The liquid medium may be an aqueous medium, an organic medium or a mixed medium thereof. When the mineralization agent has a peptide chain, denaturation of the peptide may be taken into account.

The liquid medium may typically be a buffer having approximately neutral pH or a mixed solution containing the buffer. The liquid medium may have any pH without particular limitation; however pH may be about 5 or more and 8 or less. The salt concentration thereof is not particularly limited and may be 10 mM or more and 1 M or less. The temperature is not particularly limited and the binding may readily occur without temperature control. Typically, the temperature may be 4 deg C. or higher and 80 deg C. or lower, more preferably 10 deg C. or higher and 40 deg C. or lower and still more preferably 15 deg C. or higher and 30 deg C. or lower.

In order to bring a rare earth ion into contact with the mineralization agent, the contact efficiency may be increased by providing appropriate stirring. The duration of contact is not particularly limited and may be about 10 minutes to several hours, preferably 30 minutes or more and 8 hours or less. The upper limit of the duration is more preferably 6 hours or less and still more preferably about 4 hours or less. The duration may be more preferably about 1 hour or more and 3 hours or less.

It is preferable to appropriately adjust, e.g. extend or shorten, pH, temperature and/or incubation time because production or deposition of the rare earth mineral by mineralization may vary depending on pH, temperature and/or incubation time.

The concentration of the mineralization agent and the concentration of mineralization raw materials in a liquid medium in order to allow exhibition of mineralization ability of the mineralization agent are not particularly limited. However, it is preferred that the concentration of the mineralization agent is 5 uM (micromolar) or higher and the concentration of the rare earth ion is 100 uM or higher. It is preferable that the mineralization raw material other than the rare earth ion has similar concentration as that of the rare earth ion.

According to the method of separation of the present invention in which the mineralization agent having a mineralization tendency that allows mineralization of a rare earth ion sought to be separated is used, the rare earth ion can be separated. In order to separate one or more rare earth ions of the heavy rare earth ion series, for example, the mineralization agent having such a mineralization tendency is used. In order to separate one or more rare earth ions of the light rare earth ion series, the mineralization agent having such a mineralization tendency is used.

For example, when separating Yb ion and/or Lu ion, which are rare earth ions of the heavy rare earth ion series, from a separation target which may contain the ions, the mineralization agent having the mineralizing region containing the mineralization sequence (2) described above may be used. The mineralization agent has a mineralization tendency such that the mineralization ability for Yb and Lu is high, and thus can effectively mineralize Yb and Lu and separate them as rare earth minerals (such as hydroxides).

When separating a Dy ion, which is a rare earth ion of the heavy rare earth series, from a separation target which may contain the Dy ion, the mineralization agent having the mineralizing region containing the mineralization sequence (1) may be used. The mineralization agent has a mineralization tendency such that the mineralization ability for the light rare earth ion series is low and the mineralization ability for the heavy rare earth ion series is high, and thus can effectively mineralize a Dy ion and separate the same as a rare earth mineral (such as a hydroxide). Thus, even when the separation target contains a light rare earth ion series, a Dy ion and the like may be effectively separated.

When separating a Nd ion or the like from a separation target which may contain one or more rare earth ions such as a Nd ion of the light rare earth ion series, the mineralization agent having the mineralizing region containing the mineralization sequence (3) is applied to the separation target to separate on one or more light rare earth ions as rare earth minerals.

According to the present separation method, one or more rare earth ions may be selectively separated from a separation target which may contain two or more rare earth ions by utilizing the mineralization tendency of the mineralization agent. For example, when separating one or more heavy rare earth ions from a separation target which may contain one or more rare earth ions of the light rare earth ion series and one or more rare earth ions of the heavy rare earth ion series, the mineralization agent having the mineralization sequence (1) or (2) may be used depending on the heavy rare earth ion which is sought to be separated.

Similarly, one or more light rare earth ions may be separated from a separation target which may contain one or more rare earth ions of the light rare earth ion series and one or more rare earth ions of the heavy rare earth ion series. In this case, the mineralization agent having a mineralization sequence having high mineralization ability for the light rare earth ion which is sought to be separated may be used.

For example, when separating a Dy ion from a separation target which may contain a Nd ion, which is a light rare earth, and the Dy ion, which is a heavy rare earth ion, the mineralization agent having the mineralization sequence (1) may be used. The mineralization agent has the mineralization tendency such that the mineralization ability for a Nd ion is low and the mineralization ability for a Dy ion is high, and thus can effectively mineralize a Dy ion and separate the same as a rare earth mineral (hydroxide). For example, a neodymium magnet contains dysprosium added thereto. The aspect of the present separation is useful for the recovery of dysprosium during manufacture of neodymium magnets and recovery of dysprosium from scraps of neodymium magnets.

The mineralization agent having the mineralization sequence (1) may also be similarly used for separation of, for example, a Dy ion from a separation target which may contain a La ion, which is a light rare earth, and the Dy ion, which is a heavy rare earth ion. The mineralization agent has a mineralization tendency such that the mineralization ability for a La ion is low and the mineralization ability for a Dy ion is high, and thus can effectively mineralize a Dy ion and separate the same as a rare earth mineral (hydroxide).

According to the present separation method, two or more rare earth ions may be selectively separated from a separation target which may contain two or more rare earth ions by utilizing different mineralization tendencies of two or more mineralization agents. For example, when separating a light rare earth ion and a heavy rare earth ion from a separation target containing rare earth ions of the light rare earth ion series and the heavy rare earth ion series, the heavy rare earth ion may be first mineralized with the mineralization agent having a high mineralization ability for the heavy rare earth ion series to separate the same from the medium as a rare earth mineral and then the light rare earth ion may be mineralized with the mineralization agent having a high mineralization ability for the light rare earth ion series to separate the same as a rare earth mineral.

When, for example, separating a Nd ion and a Dy ion from a separation target which may contain the ions, the Dy ion may be first separated as a rare earth mineral with the mineralization agent having the mineralization sequence (1) and then the Nd ion may be separated as a rare earth mineral by applying the mineralization agent having the mineralization sequence (3) to the remaining separation target.

Various aspects of the separation method of the disclosure have been described hereinabove. According to the disclosure herein, a custom mineralization tendency of the mineralization agent may be devised by appropriately designing the cyclic structure which can be formed by the mineralization agent. A mineralization agent having an intended mineralization tendency may also be screened. Thus, according to the disclosure herein, a mineralization agent may be designed so as to separate a rare earth ion in an intended manner and the rare earth ion may be mineralized and separated as a rare earth mineral by using the mineralization agent.

Thus according to the disclosure herein, a method for separating a rare earth ion, comprising the steps of designing and obtaining a mineralization agent according to the separation mode of a rare earth ion sought to be separated, and using the obtained mineralization agent to mineralize the rare earth ion sought to be separated from one or more rare earth ions and separate the rare earth ion as a rare earth mineral.

The rare earth mineral generated after mineralization may be obtained as an insoluble matter (precipitate) or the like in a liquid medium under incubation. The solid phase may be collected by a well-known solid-liquid separation means such as centrifugation and the mineralization agent or the like may be separated by optionally using a surfactant and the like to obtain a rare earth mineral separated from the mineralization agent. The rare earth mineral may be obtained by optional drying and/or burning.

The burning step for crystallization may be carried out according to well-known conditions for crystallization of well-known amorphous compounds. For example, the heating temperature may be 300 deg C. or higher and 1500 deg C. or lower. When the rare earth mineral is an inorganic salt such as a carbonate salt, the heating temperature may be selected so as to crystallize the inorganic salt while preserving the state of the inorganic salt. The temperature for dissociation of an inorganic acid such as dehydration from a hydroxide or decarboxylation from a carbonate salt to obtain an oxide may be appropriately selected so that the dissociation may occur.

It is advantageous that separation of a rare earth ion with the mineralization agent may be carried out under simple and low-cost conditions. It is also advantageous that particles of a rare earth mineral at a level of nm size may be obtained using the mineralization agent.

The rare earth mineral generated according to the mineralization ability of the mineralization agent is in the form of a particle in which rare earth is detected. It is assumed that the generated rare earth mineral is a hydroxide, salt or oxide (or hydrate thereof) of rare earth. The generated rare earth mineral may be crystal or amorphous when it is generated. The rare earth mineral which is amorphous may be crystallized by optionally carrying out the burning step.

(Detection Method of Rare Earth Ion)

According to the present specification, a method for detecting a rare earth ion is provided. The method for detecting a rare earth ion includes the step of bringing one or more rare earth ions into contact with a mineralization agent for mineralizing the rare earth ion(s). According to the detection method, one or more rare earth ions are separated as a rare earth mineral(s) according to the mineralization tendency of the mineralization agent for rare earth ion series. The method further including the step of detecting the rare earth mineral or a rare earth species in the rare earth mineral allows detection of the rare earth ion(s).

The method for separating a rare earth ion may be used as a method for detecting a rare earth ion by further including the step of detecting the rare earth mineral or a rare earth species in the rare earth mineral. According to the detection method, it is possible to detect the type of one or more rare earth ions of the rare earth ion series which may be contained in a mixture thereof. Accordingly, a mineralization agent having suitable mineralization tendency for separation of one or more rare earth ions from a separation target, which corresponds to the mixture, may be selected.

Detection of a rare earth may be carried out by detecting a rare earth mineral generated with the mineralization agent. Alternatively, detection of a rare earth may be carried out by detecting information imparted to the mineralization agent in order to identify the specific rare earth ion (such as location information on a label substance, a bead or on an array) or an antibody specifically binding to the mineralization agent.

(Other Features)

According to the present specification, a DNA such as a nucleotide encoding a mineralization sequence formed of a peptide, a mineralizing region including the sequence and a mineralization agent including the foregoing, a DNA for expressing the DNA as a peptide having certain amino acid sequence and a vector including the DNA are also provided. A person skilled in the art can easily obtain such a DNA and construct the vector for expression according to well-known methods in the art. The vector for expression contains elements selected according to the type of host cells used for expression of DNA encoding the mineralization sequence or the mineralizing region.

According to the present specification, a support carrying a mineralization agent on a solid phase carrier is also provided. The mineralization agent may be supported on, for example, a particulate substance such as a bead or a sheet-shaped substance made of a variety of materials. Such a solid phase carrier is well known and a person skilled in the art can appropriately make a selection and use the same. The mode and manner of immobilization of a peptide or the like on such a solid phase carrier are well known. A person skilled in the art can appropriately select the manner of immobilization, select a desirable mode (immobilization pattern on a sheet-shaped solid phase carrier) and obtain a peptide solid phase carrier. A particulate solid phase carrier may typically be a solid phase carrier carrying the present peptide on the whole surface thereof by dipping and the like. A sheet-shaped solid phase carrier may carry the present peptide in a film-like or any other pattern by dipping, coating or spotting or spotting. The support is useful as a column, a bead or an array device for separation and detection of a rare earth ion.

A support carrying a mineralization agent on a biological carrier is also provided. Specifically, a peptide having the mineralization sequence may be displayed on a surface layer or may form a surface layer of a biological carrier such as a cell. Examples of the biological carrier include various microorganisms, plant cells, animal cells, viruses and phages. The mineralization agent which is a peptide may be displayed on the surface layer of a microorganism such as yeast or *Escherichia coli* or may form an outer protein of a phage or virus. The support is also useful as a device for separation and detection of a rare earth ion.

The disclosure herein is specifically explained by way of Examples which do not limit the present invention.

Example 1

(Construction of Random Peptide-Displaying T7 Phage Library)

PCR reaction was carried out using two oligonucleotide primers: T7-Libup (ATG ATT ACC ACG ATC CGA ATT CAG GTG GAG GTT CG; SEQ ID NO: 35) and T7-Libdownt (ACT ATC GTC GCC CGC AAG CTT TTA GCT; SEQ ID NO: 36) to amplify a template DNA (CGA ATT CAG GTG GAG GTT CGT GT (SEQ ID NO: 37)+(NNK) 9-12+TGT AGC TAA AAG CTT GCG GCC GA (SEQ ID NO: 38)).

N=A: 25%, T: 25%, G: 25%, C: 25% (mixed base of A/T/G/C at equal amounts)

K=mixed base of A: 0%, T: 50%, G: 50%, C: 0%

The amplified DNA fragments were subjected to phenol treatment and butanol concentration according to conventional protocols, followed by purification with the QIAquick PCR Purification kit (QIAGEN), Purified DNAs were treated w-th restriction enzymes Hind III and Eco RI (TaKaRa Bio Inc.) and ligated to the T7 select 10-3 vector arms (Novagen) to construct T7 phage genomes.

The constructed phage genomes were mixed with the T7 select packaging solution (Novagen) to construct T7 phages having random peptide gene-introduced T7 genomic DNA. The obtained phages were sampled and counted for the phage population. It was found that the phage library constructed had a sequence diversity of $1.0\times10^6$ to $4.0\times10^7$.

After amplifying the constructed phage population by infection of *E. coli* BLT35403 which was cultured until $OD_{660nm}$=0.6 to 1.0, the phages were concentrated and purified by general protocol using 8% polyethylene glycol and thereafter the phages were passed through through a 0.22 um (micrometer) filter. The number of phages was counted after purification, from which it was found that each library contained about $1.0\times10^{12}$ pfu/ml of phages and one peptide phage was amplified by 100,000 to 1,000,000 times.

Example 2

(Biopanning Against Dysprosium Oxide and Neodymium Oxide Using Random Peptide-Displaying T7 Phage Library)

Using the random peptide-displaying T7 phage library prepared in Example 1, it was sought to separate T7 phages displaying peptides binding to dysprosium oxide and neodymium oxide ($Nd_2O_3$) (Sigma-Aldrich). The scheme is shown in FIG. 1.

Dysprosium oxide and neodymium oxide were respectively washed in a mixed solution of methanol:acetone (1:1), then washed in isopropanol and dispersed in TBS.

The dispersions respectively containing 500 ug (microgram) of dysprosium oxide and neodymium oxide were respectively mixed with the T7 phage library and reaction was allowed to proceed for 1 hour at room temperature. Thereafter particles were precipitated by centrifugation (6000 rpm, 3 minutes) and the supernatant was removed, thereby removing unbound phage.

After removing the supernatant, the precipitate was added with TBST to disperse dysprosium oxide. The dispersion was again centrifuged in order to remove the phages non-specifically binding to the particles. By repeating the procedure (washing procedure) 3 to 10 times, peptide phages non-specifically binding to dysprosium oxide were removed.

After removing unbound phages and non-specifically binding phages by washing, the remaining phages were mixed with a solution (10 ml) of *E. coli* BLT 5403 cultured until $OD_{660nm}$=0.6 to 1.0 and incubated at 37 deg C. until complete lysis of *E. coli.*

After complete lysis of *E. coli,* 5 M NaCl was added in an amount of 1/10 of the culture medium, the mixture was centrifuged (3500 rpm, 15 minutes) to precipitate the in soluble fraction including cell walls of *E. coli* and the like and the supernatant was recovered.

A solution of 50% polyethylene glycol 6000 was added in an amount of 1/6 of the recovered supernatant, and the mixture was stirred and centrifuged at 3500 rpm for 15 minutes to precipitate T7 phages. The precipitated T7 phage population was dissolved in a TBS solution, subjected to the filtering treatment through a 0.22 um filter and stored at 4 deg C. until use.

Example 3

(Confirmation of Dysprosium Oxide- and Neodymium Oxide-Binding Phages Concentrated by Biopanning)

After repeating the series of procedures described in Example 2 5 times, the number of phages binding to dysprosium oxide or neodymium oxide was determined after each cycle of the procedures.

First of all, dysprosium oxide and neodymium oxide were respectively washed in a mixed solution of methanol and acetone (1:1), washed in isopropanol and dispersed in TBS.

Dispersions respectively containing 500 ug of dysprosium oxide and neodymium oxide were respectively mixed with pooled phages after each cycle and the reaction was allowed to proceed for 1 hour at room temperature. Thereafter each reaction solution was centrifuged (6000 rpm, 3 minutes) and the supernatant was removed. The precipitate was washed in TBST 10 times.

Figure 2A:
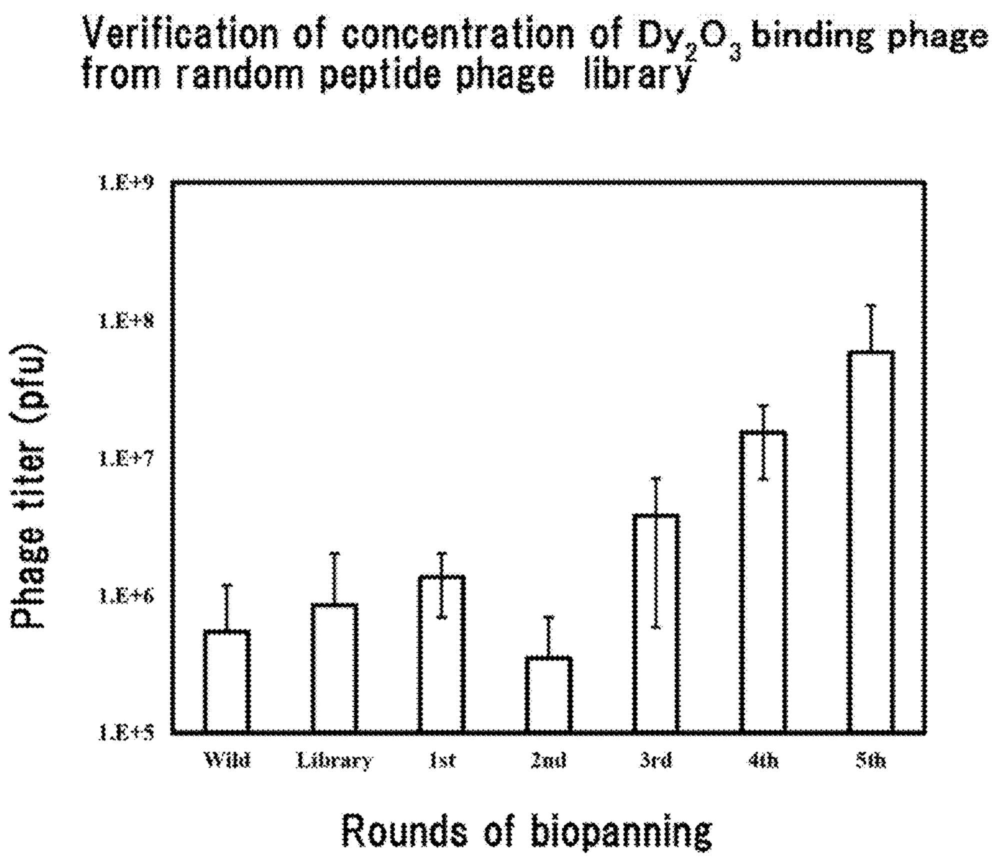
FIG. 2A illustrates the results of measurement of dysprosium oxide-binding phage titer in relation to the number of cycles of biopanning.
Figure 2B:
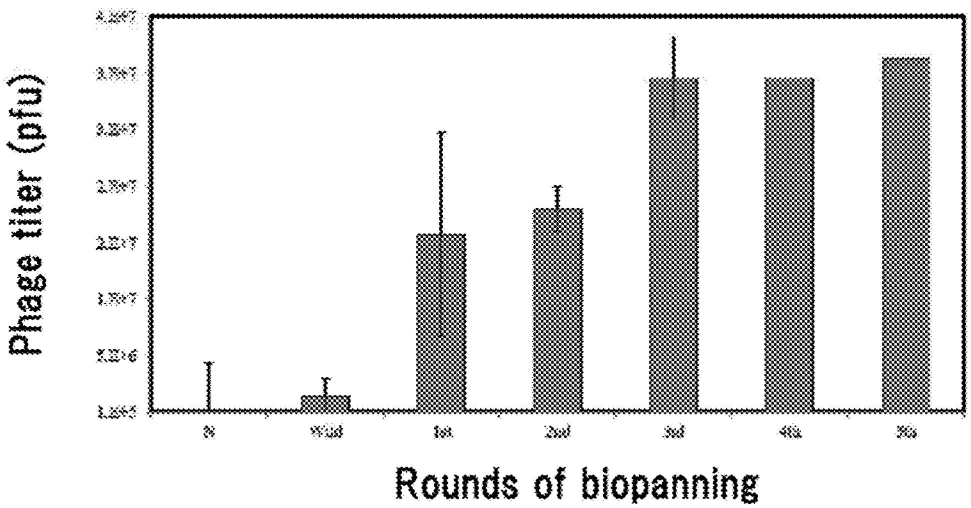
FIG. 2B illustrates the results of measurement of neodymium oxide-binding phage titer in relation to the number of cycles of biopanning.

After washing, the number of phages binding to dysprosium oxide particles and neodymium oxide particles was respectively determined by plaque assay. The results are shown in FIG. 2A and FIG. 2B. As shown in FIG. 2A, the number of phages binding to dysprosium oxide particles was increased with the progress of panning. Similarly, the number of phages binding to neodymium oxide particles was increased with the progress of panning as shown in. FIG. 2B. From these results, it was found that the repetition of panning allows screening of phages displaying peptides having excellent binding abilities to dysprosium oxide and neodymium oxide.

Example 4

The pooled phage after 5 cycles of panning for dysprosium oxide was used to obtain monoclones of phages, and randomly-selected 35 kinds of phages were subjected to the analysis of peptide sequences displayed thereby. As a result, 31 different sequences were confirmed.

The pooled phage after 5 cycles of panning for neodymium oxide was also used to obtain monoclones of phages, and 96 kinds of phages were subjected to the measurement of binding thereof to neodymium oxide particles. For 11 kinds of clones, binding to neodymium oxide was confirmed. These clones were subjected to the analysis of peptide sequences displayed thereby. A characteristic amino acid sequence (SEQ ID NO: 31) is shown below

TABLE 1

| No | Sequence | Target | Frequency |
|---|---|---|---|
| 9-4 | SCLYPSWSDYAFCS | $Dy^{2}O^{3}$ | 4/35 |
| 10-20 | SCLWGDVSELDFLCS | $Dy^{2}O^{3}$ | 2/35 |
| 11-77 | SCVWFSDVGDFMVCS | $Nd^{2}O^{3}$ | 10/86 |

As shown in Table 1, sequences 9-4 (SEQ ID NO: 16) and 10-20 (SEQ ID NO: 4) were found in 4 and 2 clones, respectively, and were free from basic amino acids (K, R and H) unlike other amino acid sequences. The sequence 11-77 (SEQ ID NO: 31) was found in 10 clones. This amino acid sequence was also free from basic amino acid (K, R and H).

Example 5

(Confirmation of Binding of Redundant Phages to Various Lanthanoid Oxides)

In the present Example, binding of phages indicated in Table 1 to various lanthanoid oxides were confirmed. Each lanthanoid oxide (dysprosium oxide or neodymium oxide) was first washed in a mixed solution of methanol and acetone (1:1), washed in isopropanol and dispersed in TBS (50 mM Tris, 150 mM NaCl).

The dispersion of 500 ug of each lanthanoid oxide in TBS was mixed with phages and the reaction was allowed to proceed for 1 hour at room temperature. Thereafter the mixture was centrifuged (6000 rpm, 3 minutes) and the supernatant was removed. The precipitate was washed in TBST (50 mM Tris, 150 mM NaCl, 0.1% Tween) 10 times.

After washing, the number of phages binding to each lanthanoid oxide was determined by plaque assay. The results are shown in FIG. 3.

As shown in FIG. 3, the sequences 9-4 and 10-20 isolated by biopanning against dysprosium oxide and 11-77 isolated by biopanning against neodymium oxide reproduced binding thereof to each oxide. The peptides were designated as Lamp-2, Lamp-1 and Lamp-3 (Lanthanoid Mineralization Peptide), respectively.

Example 6

(Preparation of Synthetic Peptides)

Each of peptides Lamp-1 and Lamp-2 and Lamp-3, of which binding to dysprosium oxide and neodymium oxide, respectively, was confirmed, was synthesized by Fmoc solid-phase synthesis. The synthesized peptides were biotinylated at the N-terminal via GGG derived from g10 sequence.

Each peptide was cleaved from the resin and deprotected and an intramolecular disulfide bond was formed using an appropriate oxidizing agent such as iodine. The peptide was then purified by reverse-phase HPLC and lyophilized.

Example 7

(Evaluation of Mineralization Ability of Synthetic Peptides)

Synthetic peptides (Lamp-1, -2 and -3) prepared in Example 6 were used for evaluation of mineralization ability.

Each peptide was diluted in an MES buffer (MES 50 mM, pH 6) so as to be 150 uM (DMSO 5%) and each of 13 rare earth ions in the rare earth ion series was added. Lanthanoid ions were added in the form of nitrate salts.

After 1 hour, the turbidity (Abs. 600 nm) of each solution was measured on an absorption spectrometer. The results are shown in FIG. 4.

Figure 4:
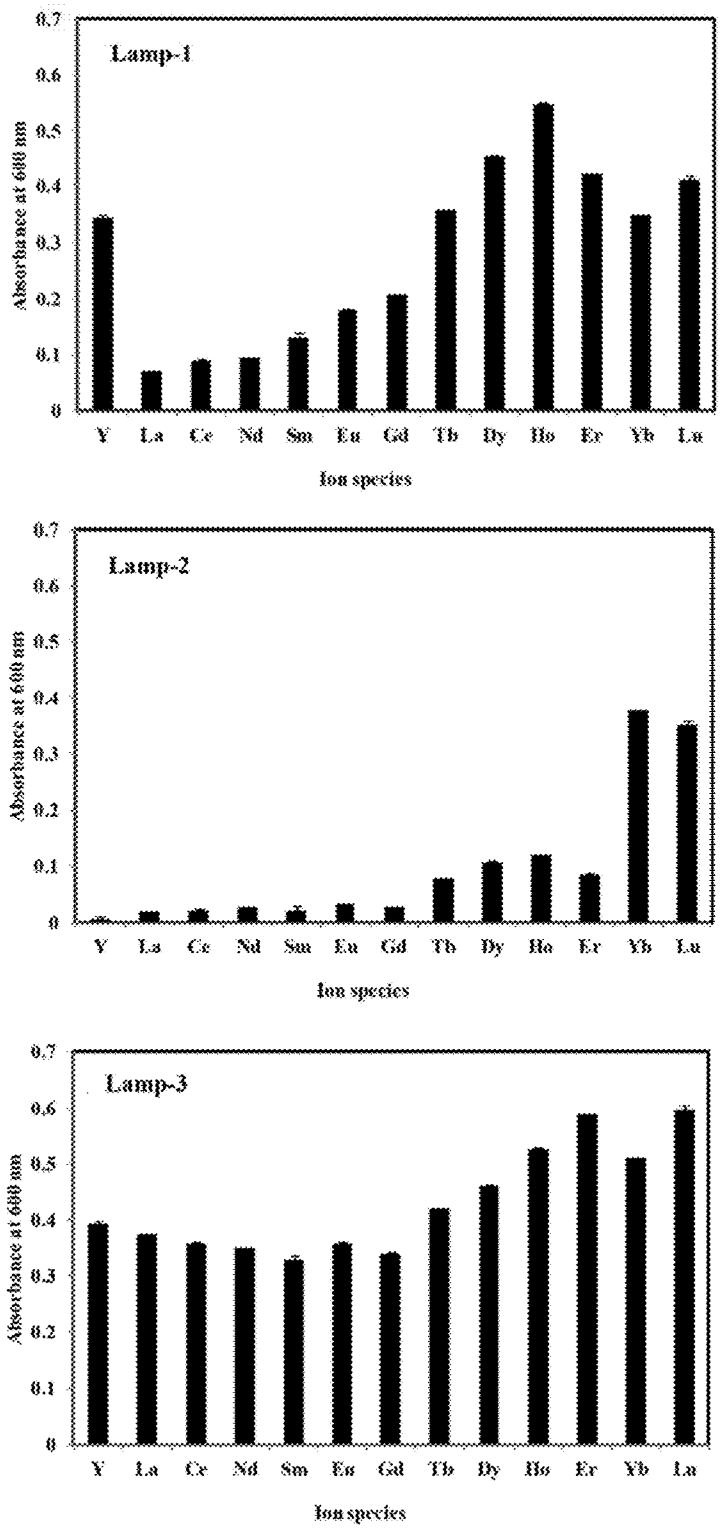
FIG. 4 illustrates the results of evaluation of binding specificity of Lamp-1 to Lamp-3 peptides.

As shown in FIG. 4, Lamp-2 did not have effective mineralization ability for the light rare earth ion series while having effective mineralization ability for the heavy rare earth ion series, particularly high mineralization ability for Yb and Lu.

Lamp-1, as a whole, had mineralization ability for the heavy rare earth ion series rather than for the light rare earth ion series, had effective mineralization ability for the medium rare earth ion series in the light rare earth series, and had generally high mineralization ability for the heavy rare earth ion series.

Lamp-3 had mineralization ability for all rare earth ion series.

Particles generated after mineralization with peptides Lamp-1 to -3 were subjected to elemental analyses by EDX and confirmed that the particles were derived from the respective rare earth ions.

From these results, it was found that the peptides had different mineralization tendencies for rare earth ion series. It was suggested that by utilizing the mineralization tendencies of different mineralization abilities for rare earth ions belonging to the rare earth ion series, the rare earth ions belonging to the rare earth ion series may be separated from each other. It was also suggested that by utilizing the difference in the mineralization tendency of the peptides, the rare earth ions belonging to the rare earth ion series may be separated from each other.

Example 8

(Separation of Dysprosium Ion from a Mixture of Two Lanthanoid Ions): Part 1

To a mixed solution of 1 mM dysprosium nitrate and 1 mM neodymium nitrate, the Lamp-1 peptide was added at 20 μM. The solution was left to stand for 5 hours, and the produced precipitate was then sedimented by centrifugation at 15000 rpm for 10 minutes to remove the supernatant, was added with 100 ul (microliter) of ultrapure water and was thoroughly stirred to wash. After repeating such washing twice, the precipitate was dispersed in 20 ul of ultrapure water, 10 ul of the dispersion was dropped on a carbon tape which was then left in a clean bench until dry. The dried precipitate was analyzed on SEM/DEX (Hitachi High-Technologies Corporation). The results are shown in FIG. 5.

Figure 5:
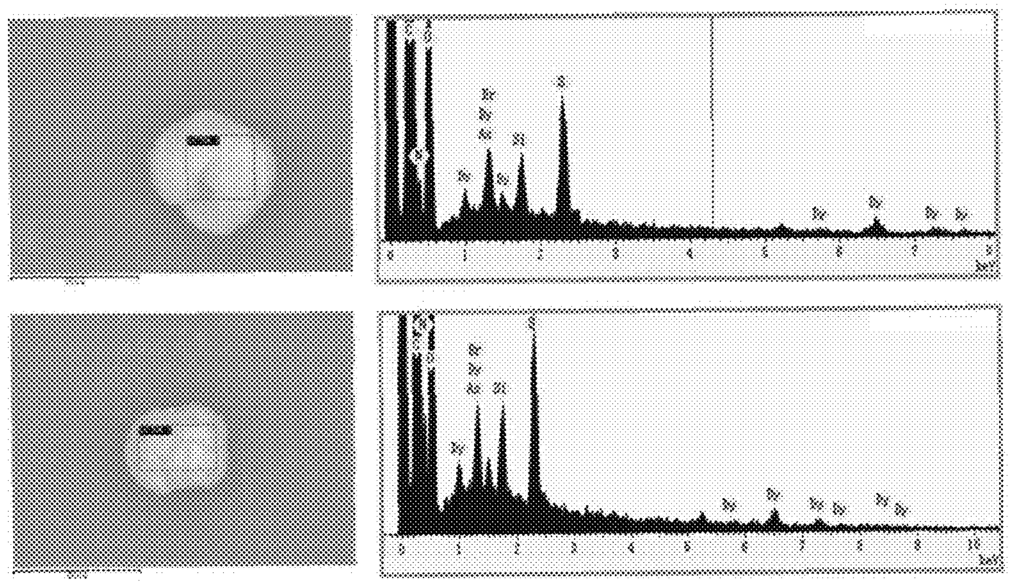
FIG. 5 illustrates the results of separation of a dysprosium ion from a rare earth ion mixture.

As shown in FIG. 5, only a peak of dysprosium was observed in the precipitate without a peak of neodymium. Accordingly, it was found that the Lamp-1 peptide allows separation of a dysprosium ion from a neodymium ion.

Example 9

(Separation of a Dysprosium Ion from a Mixture of Two Lanthanoid Ions): Part 2

To a mixed solution of 1 mM dysprosium nitrate and 1 mM lanthanum nitrate, the Lamp-1 peptide was added at 20 uM. The solution was left to stand for 5 hours, and the produced precipitate was then sedimented by centrifugation at 15000 rpm for 10 minutes to remove the supernatant, was added with 100 ul of ultrapure water and was thoroughly stirred to wash. After repeating such washing twice, the precipitate was dispersed in 20 ul of ultrapure water, 10 ul of the dispersion was dropped on a carbon tape which was then left in a clean bench until dry. The dried precipitate was analyzed on SEM/DEX (Hitachi High-Technologies Corporation). The results are shown in FIG. 6.

Figure 6:
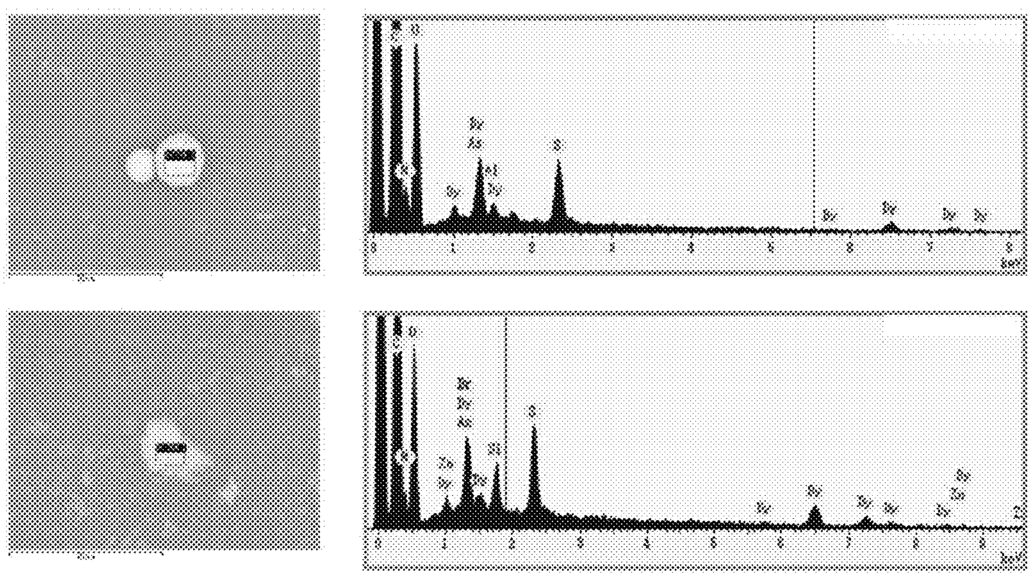
FIG. 6 illustrates the results of separation of a dysprosium ion from a rare earth ion mixture.

As shown in FIG. 6, only a peak of dysprosium was observed in the precipitate without a peak of lanthanum. Accordingly, it was found that the Lamp-1 peptide allows separation of a dysprosium ion from a lanthanum ion.

Example 10

(Evaluation of Binding Specificity of Synthetic Peptides)

Bindings of synthetic peptides Lamp-2 and Lamp-1 and rare earth metal oxide particles ($La_2O_3$, $CeO_2$, $Nd_2O_3$, $Sm_2O_3$, $GD_2O_3$, $Tb_4O_7$, $Dy_2O_3$, $Ho_2O_3$, $Er_2O$, $Yb_2O_3$, $Y_2O_3$, $TiO_2$, hydroxyapatite and Ag) immobilized on microplates were evaluated. The results for Lamp-2 and Lamp-1 are shown in FIGS. 7 and 8, respectively.

Figure 7:
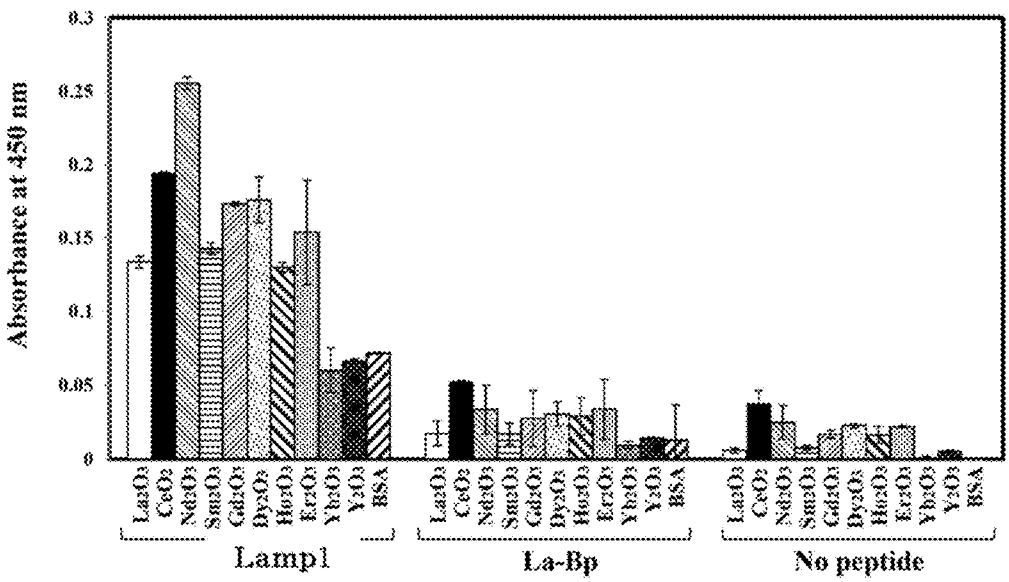
FIG. 7 illustrates the results of evaluation of binding specificity of Lamp-1 rare earth minerals.

As shown in FIG. 7, Lamp-1 (SEQ ID NO: 4) had high binding ability to $La_2O_3$, $CeO_2$, $Nd_2O_3$, $Sm_2O_3$, $Gd_2O_3$, $Dy_2O_3$, $Ho_2O_3$ and $Er_2O_3$. Among others, Lamp-1 showed high binding ability to $CeO_2$, $Nd_2O_3$, $Gd_2O_3$ and $Dy_2O_3$, further showed high binding ability to $CeO_2$ and $ND_2O_3$ and showed the highest binding ability to $Nd_2O_3$. La—BP showed little binding to $La_2O_3$ and some binding to $CeO_2$ of which extent was incomparable to the binding ability of Lamp-1.

Figure 8:
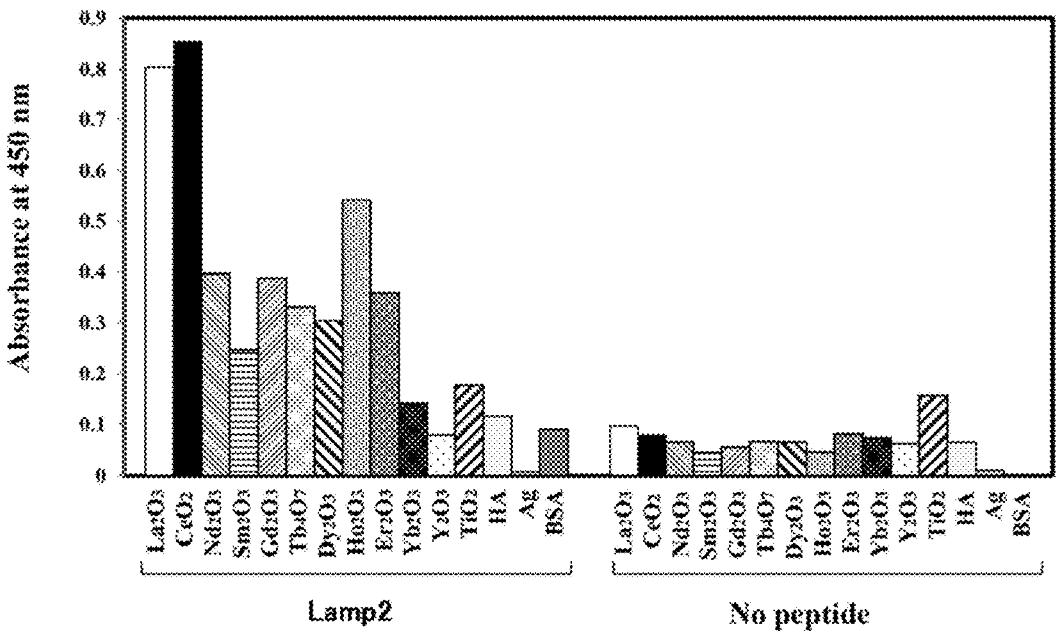
FIG. 8 illustrates the results of evaluation of binding specificity of Lamp-2 for rare earth minerals.

As shown in FIG. 8, Lamp-2 (SEQ ID NO: 16) had high binding ability to $La_2O_3$, $CeO_2$, $Nd_2O_3$, $Sm_2O_3$, $Gd_2O_3$, $Tb_4O_7$, $Dy_2O_3$, $Ho_2O_3$ and $Er_2O_3$. Among others, Lamp-2 showed high binding ability to $CeO_2$, $Nd_2O_3$, $Gd_2O_3$ and $Dy_2O_3$, further showed high binding ability to $La_2O_2$, $CeO_2$ and $Ho_2O_3$ and showed the highest binding ability to $La_2O_3$ and $CeO_2$.

According to the above results, it was found that synthetic peptides Lamp-2 and Lamp-1 had binding ability to more than one oxides of rare earths belonging to the lanthanoid series, while respectively showed distinct binding specificity to the oxides.

Example 11

(Alanine Substitution Test of Lamp-1 Peptide)

T7 phages displaying peptide sequences which were alanine substituents at each amino acid position in the amino acid sequence of the Lamp-1 peptide (SEQ ID NO: 4) were prepared in the same manner as in Example 1 using the T7-Libup and T7-Libdown indicated in Example 1 and oligonucleotide primers (SEQ ID NOs: 39 to 53) shown in Table 2. Peptide sequences displayed by prepared phages are shown in FIG. 9.

TABLE 2

| Primers for alanine substitution phage preparation | |
|---|---|
| Oligo Name | Sequence (5' to 3') |
| 1SA | AGGATCCGAATTCAGGTGGAGGTGCATGTTTGTGGGGTGAT |
| 2CA | ATCCGAATTCAGGTGGAGGTTCGGCATTGTGGGGTGATGTT |
| 3LA | ATCCGAATTCAGGTGGAGGTTCGTGTGCATGGGGTGATGTTAGT |
| 4WA | ATCCGAATTCAGGTGGAGGTTCGTGTTTGGCAGGTGATGTTAGTGAG |
| 5GA | ATCCGAATTCAGGTGGAGGTTCGTGTTTGTGGGCAGATGTTAGTGAGCTG |
| 6DA | ATCCGAATTCAGGTGGAGGTTCGTGTTTGTGGGGTGCAGTTAGTGAGCTGGAT |
| 7VA | ATCCGAATTCAGGTGGAGGTTCGTGTTTGTGGGGTGATGCAAGTGAGCTGGATTTT |
| 8SA-rc | TCGGCCGCAAGCTTTTAGCTACACAGAAAATCCAGCTCTGCAACATCACCCCACAA |
| 9EA-rc | TCGGCCGCAAGCTTTTAGCTACACAGAAAATCCAGTGCACTAACATCACCCCA |
| 10LA-rc | TCGGCCGCAAGCTTTTAGCTACACAGAAAATCTGCCTCACTAACATCACC |
| 11DA-rc | TCGGCCGCAAGCTTTTAGCTACACAGAAATGCCAGCTCACTAACATC |
| 12FA-rc | TCGGCCGCAAGCTTTTAGCTACACAGTGCATCCAGCTCACTAAC |
| 13LA-rc | TCGGCCGCAAGCTTTTAGCTACATGCAAAATCCAGCTCACT |
| 14CA-rc | TCGGCCGCAAGCTTTTAGCTTGCCAGAAAATCCAGCTC |
| 15SA-rc | TCGGCCGCAAGCTTTTATGCACACAGAAAATCCAG |

Figure 10:
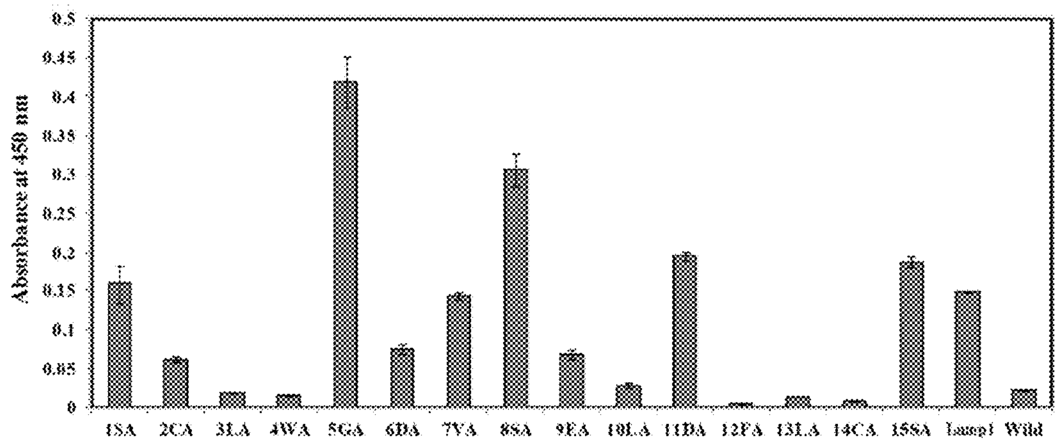
FIG. 10 illustrates the binding ability of Lamp-1 peptides from a partial mutant library to dysprosium oxide.

The prepared Lamp-1-ala substituent phages were evaluated for binding to $Dy_2O_3$; in the same manner as in Example 7. The results are shown in FIG. 10, As shown in FIG. 10, substitutions to alanine at positions 3, 4, 10 and 12 to 14 significantly affected and the amount of binding was significantly decreased. Substitutions to alanine at positions 2, 6 and 9 also significantly affected. Based on the above, it was found that the positions 3, 4, 10 and 12 to 14 are preferably leucine, tryptophan, leucine, phenylalanine, leucine and cysteine, respectively. It was also found that the positions 2, 6 and 9 are preferably cysteine, aspartic acid and glutamic acid, respectively.

Example 12

(Construction of Partial Mutant Library)

After the Lamp-2 and Lamp-1, peptide libraries of 14 or 15 residues were prepared which displayed sequences having fixed amino acids of Ser and Cys at positions 1 and 2 and Cys and Ser at positions 13 and 14 or 14 and 15, with other positions having amino acids derived from the dysprosium oxide-binding peptides at the probability of about 30%.

Partial mutant libraries were prepared in the same manner as in Example 1 using two types of DNA templates (Lamp-2-2nd and Lamp-1-2nd).

```
Lamp-2-2nd:
                                          (SEQ ID NO: 54)
CGA ATT CAG GTG GAG GTT CGT GTN JFJ OOE ONO

FNE JNF ONO FNN JFO FNJ JNN JFT GTA GCT AAA

AGC TTG CGG CCG A

Lamp-1-2nd:
                                          (SEQ ID NO: 55)
CGA ATT CAG GTG GAG GTT CGT GTN JFJ OOE ONO

FNE JNF ONO FNN JFO FNJ JNN JFT GTA GCT AAA

AGC TTG CGG CCG A
```

In two DNA templates, F, J, O, X, N, B, E and P respectively represent DNA sequences randomly synthesized so as to have the base sequences biased as follows:

F=mixed base of A: 70%, T: 10%, G: 10%, C: 10%
J=mixed base of A: 10%, T: 70%, G: 10%, C: 10%
O=mixed base of A: 10%, T: 10%, G: 70%, C: 10%
X=mixed base of A: 10%, T; 10%, G: 10%, C: 70%
N=mixed base of A, T, G and C at equal amounts
B=mixed base of T, G and C at equal amounts
E=mixed base of A: 20%, T: 20%, G: 40%, C: 20%
P=mixed base of A: 20%, T: 20%, G: 20%, C: 40%

The constructed phage populations were counted and it was confirmed that the Lamp-2 partial mutant library had a diversity of $3.0\times10^7$ and the Lamp-1 partial mutant library had a diversity of $8.0\times10^7$.

Example 13

(Biopanning Using Partial Mutant Libraries and Sequence Analysis of Peptides Displayed by Isolated Phages)

In the same manner as in Example 2, the partial mutant libraries prepared in Example 13 were subjected to biopanning against dysprosium oxide 5 times. Thereafter, obtained pooled phages were used to obtain monoclones, and analyzed for amino acid sequence of the displayed peptides in the same manner as Example 4. The amino acid sequences of peptides displayed by phage clones in the Lamp-1 and Lamp-2 libraries are shown in FIGS. 11 and 12, respectively.

As shown in FIG. 11, in the partial mutant library of the Lamp-1 peptide, there was a tendency to maintain acidic amino acid residues originally contained in the Lamp-1. Among others, the acidic amino acid residue (glutamic acid) at the residue 9 was maintained as glutamic acid or aspartic acid in 10 clones among 11 clones. In addition, the acidic amino acid residue (aspartic acid) at the residue 11 was maintained as aspartic acid or glutamic acid in 6 clones among 11 clones. The acidic amino acid residue (aspartic acid) at the residues 6 was also maintained as aspartic acid or glutamic acid in 5 clones among 11 clones. There was also a tendency to maintain the properties (neutral amino acid, acidic amino acid, basic amino acid, aromatic amino acid, cyclic amino acid, sulfur-containing amino acid, acid amide amino acid) of amino acid residues in the Lamp-1 peptide at other positions.

As shown in FIG. 12, in the partial mutant library of the Lamp-2 peptide, there was a tendency to maintain the acidic amino acid residue originally contained in the Lamp-2. Namely, the acidic amino acid residue (glutamic acid) at the residue 9 was maintained as glutamic acid or aspartic acid in all clones (14 clones). There was also a tendency to maintain the properties (neutral amino acid, acidic amino acid, basic amino acid, aromatic amino acid, cyclic amino acid, sulfur-containing amino acid, acid amide amino acid) of amino acid residues in the Lamp-2 peptide at other positions.

(Evaluation of Mineralization Activity of Lamp-1 Peptide)

Binding of the Lamp-1 peptide to a dysprosium ion was evaluated. In a HEPES buffer (HEPES 1 mM, pH 6.2), dysprosium nitrate (dysprosium was present as an ion) and the peptide dissolved in DMSO were diluted so as to be 1 mM and 10 uM (DMSO 5%), respectively, and an Eppendorf tube containing the diluted solution was statically incubated under room temperature.

After 5 hours, the tube was centrifuged at 15000 rpm for 10 minutes, the supernatant was removed and 100 ul of ultrapure water was then added to the tube to wash the precipitate by stirring. After repeating such centrifugation and washing by stirring twice, the precipitate was thoroughly dispersed in 20 ul of ultrapure water and subjected to analysis by TEM and EDX (Hitachi High Technologies Corporation). The results are shown in FIGS. 13 and 14.

Figure 13:
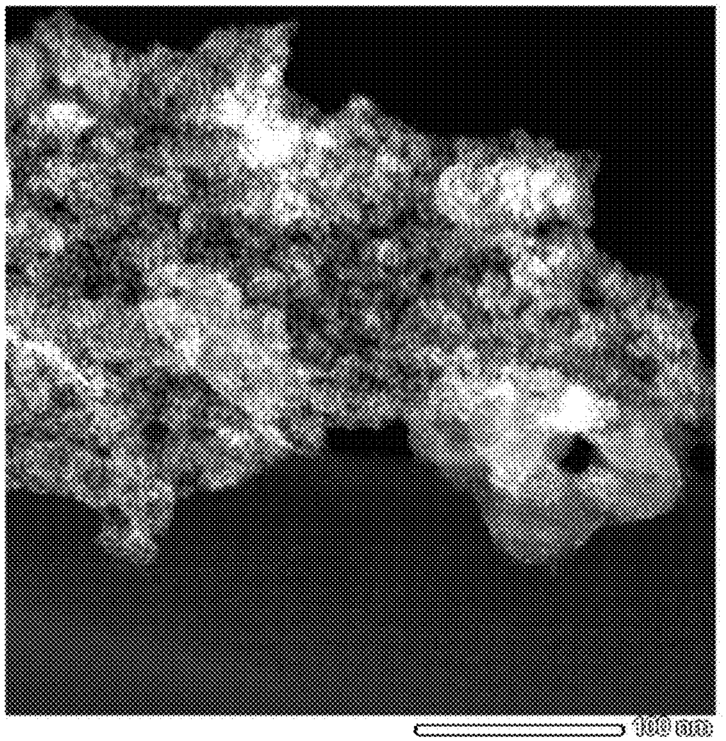
FIG. 13 illustrates the result of TEM observation of particles produced after the Lamp-1 peptide was brought into contact with a dysprosium ion.
Figure 14:
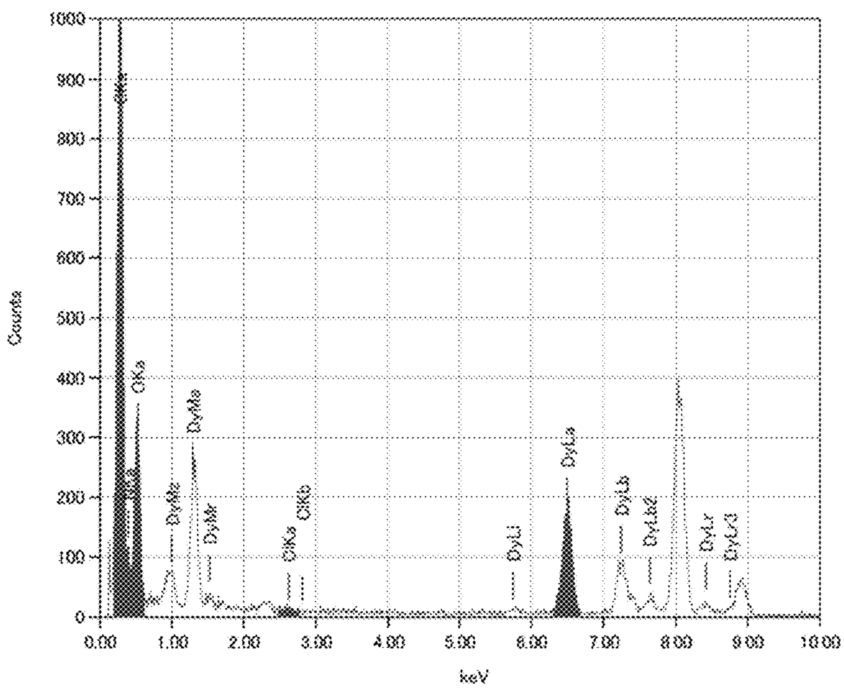
FIG. 14 illustrates the result of EDX analysis of particles produced after the Lamp-1 peptide was brought into contact with a dysprosium ion.

As shown in FIG. 13, it was confirmed by TEM analysis that some particles were produced by bringing the Lamp-1 peptide into contact with a dysprosium ion. As shown in FIG. 14, it was found by EDX analysis that the produced particles contained dysprosium.

According to the above results, it was found that the Lamp-1 peptide is capable of binding to dysprosium oxide and precipitating dysprosium hydroxide from a dysprosium ion (mineralization ability).

Example 14

(Effect of Incubation pH on Mineralization Ability of Lamp-1 Peptide)

In a HEPES buffer (HEPES 1 mM, pH 7.5), the Lamp-1 peptide (cyclized) was diluted so as to be 10 uM (DMSO 3%), pH was adjusted to 3.9 to 8 with 0.1 N HCl or 0.1 M NaOH, a dysprosium ion as dysprosium nitrate was added and the solutions were incubated under room temperature while shaking.

After 5 hours of incubation, each solution was centrifuged at 15000 rpm for 10 minutes, the supernatant was removed and 100 ul of ultrapure water was then added to the tube to wash the precipitate by stirring. After repeating such centrifugation and washing by stirring twice, the precipitate was dispersed in 20 ul of ultrapure water, 10 ul of the dispersion was dropped on a carbon tape which was then left in a clean bench until dry and analyzed by SEM/EDX. The results are shown in FIGS. 15A and 15B.

Figure 15A:
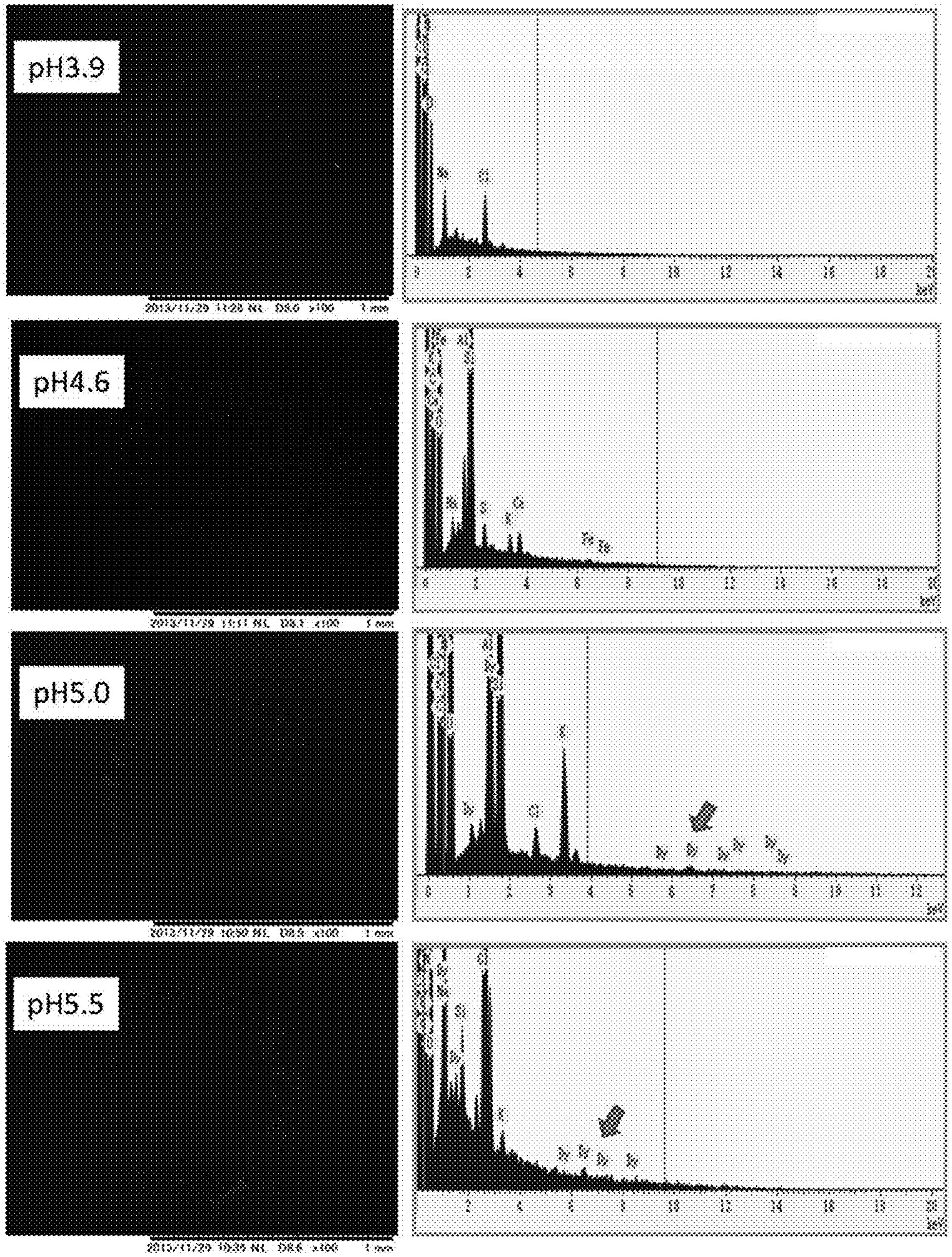
FIG. 15A illustrates an effect of incubation pH on the mineralization activity of the Lamp-1 peptide.
Figure 15B:
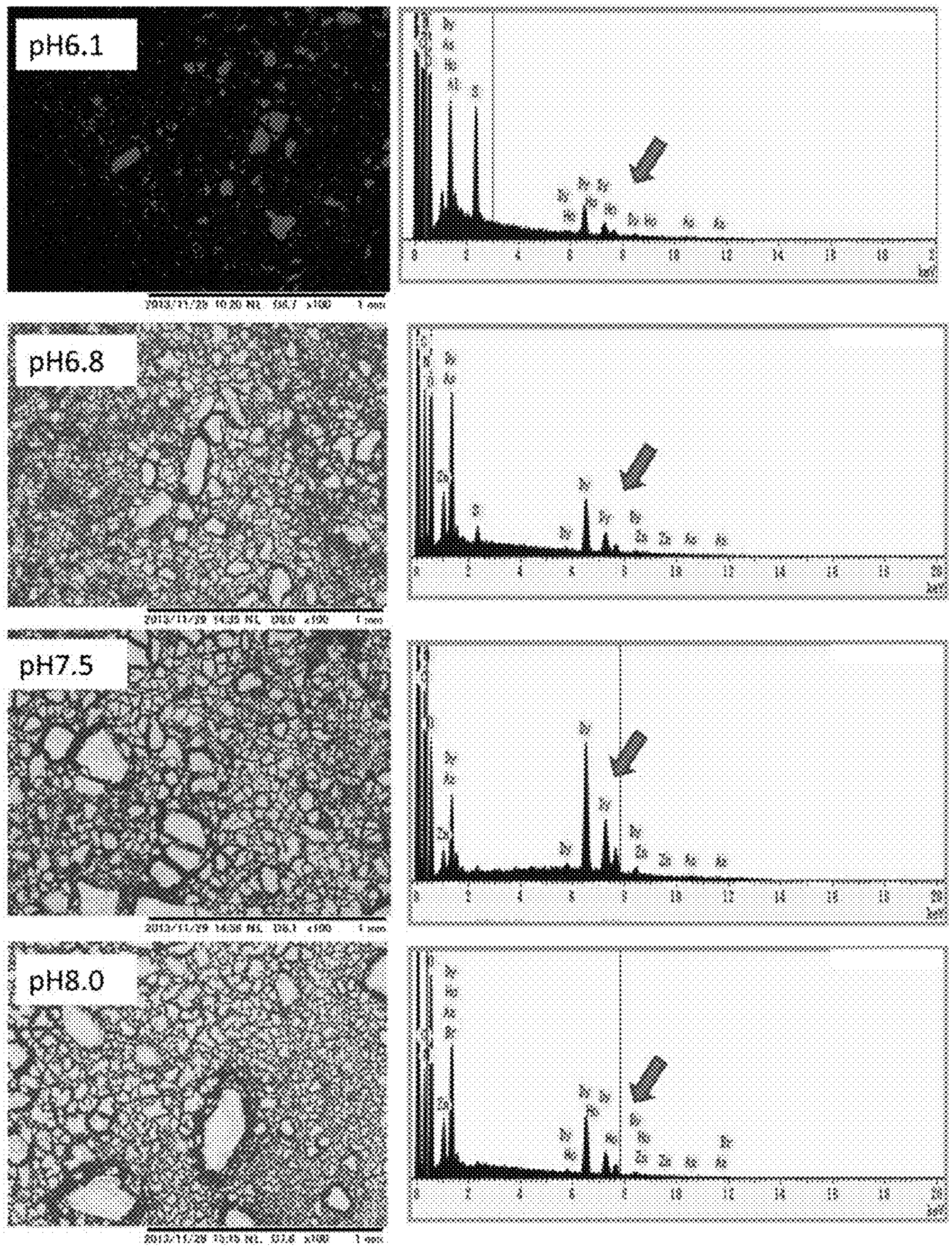
FIG. 15B illustrates an effect of incubation pH of incubation pH on the mineralization activity of the Lamp-1 peptide.

As shown in FIGS. 15A and 15B, it was found that the mineralization activity was exhibited in a wide range of pH, resulting in production of dysprosium hydroxide. In the present Example, preferable mineralization ability was confirmed in the range of pH 5.0 or higher and pH 8.0 or lower.

Example 15

(Effect of Reaction Temperature on Mineralization Activity of Lamp-1 Peptide)

In a HEPES buffer (HEPES 1 mM, pH 7.5), the Lamp-1 peptide (cyclized) was diluted so as to be 10 uM. (DMSO 3%), a dysprosium ion as dysprosium nitrate was added and the solutions were statically incubated under 4 deg C., 10 deg C., 20 deg C., 30 deg C., 40 deg C., 50 deg C., 60 deg C. and 80 deg C.

After 5 hours of incubation, each solution was centrifuged and washed by stirring in the same manner as in Example 9 and the precipitate finally obtained was subjected to analysis by SEM/EDX. The results are shown in FIGS. 16A and 16B.

Figure 16A:
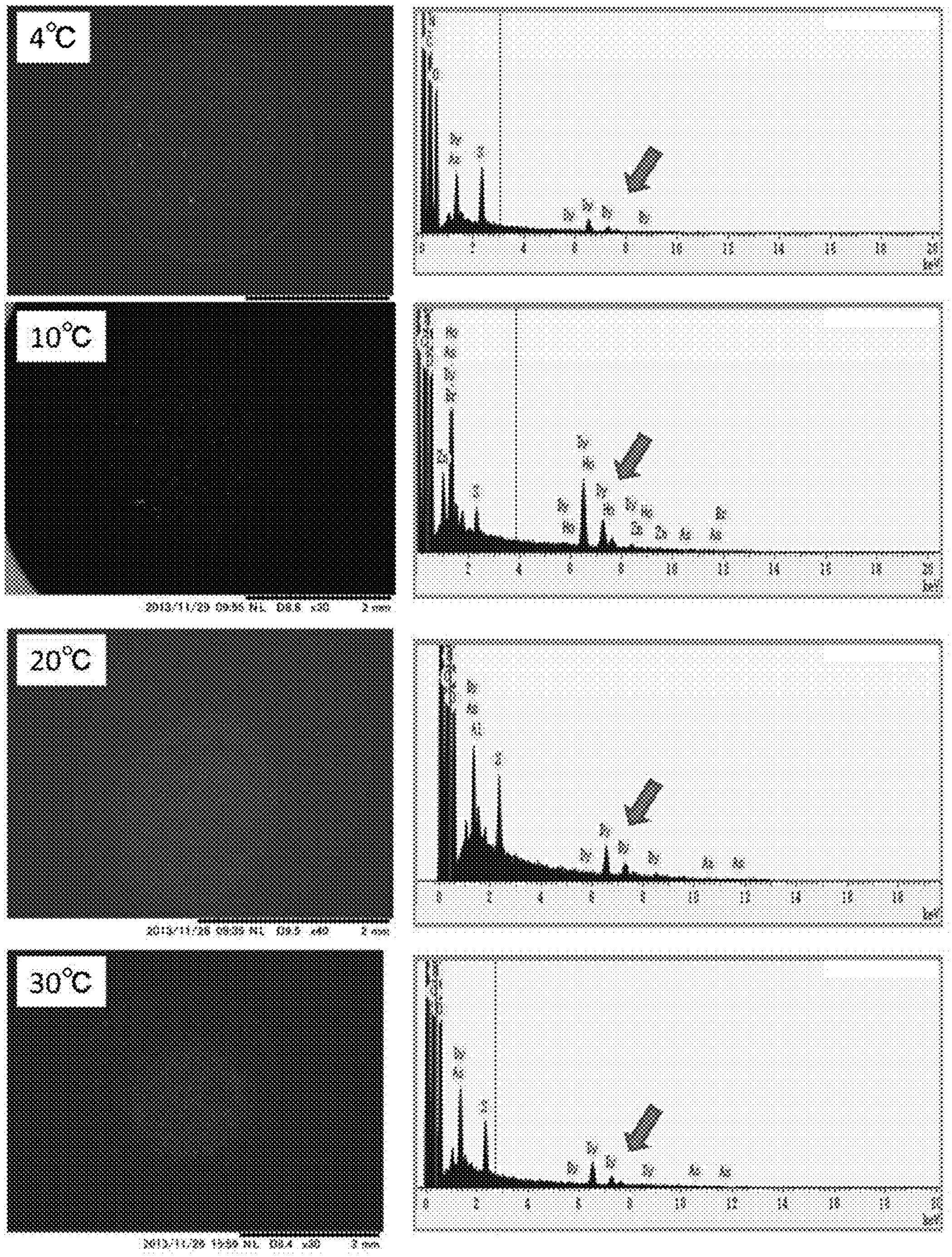
FIG. 16A illustrates an effect of incubation temperature on the mineralization activity of the Lamp-1 peptide.
Figure 16B:
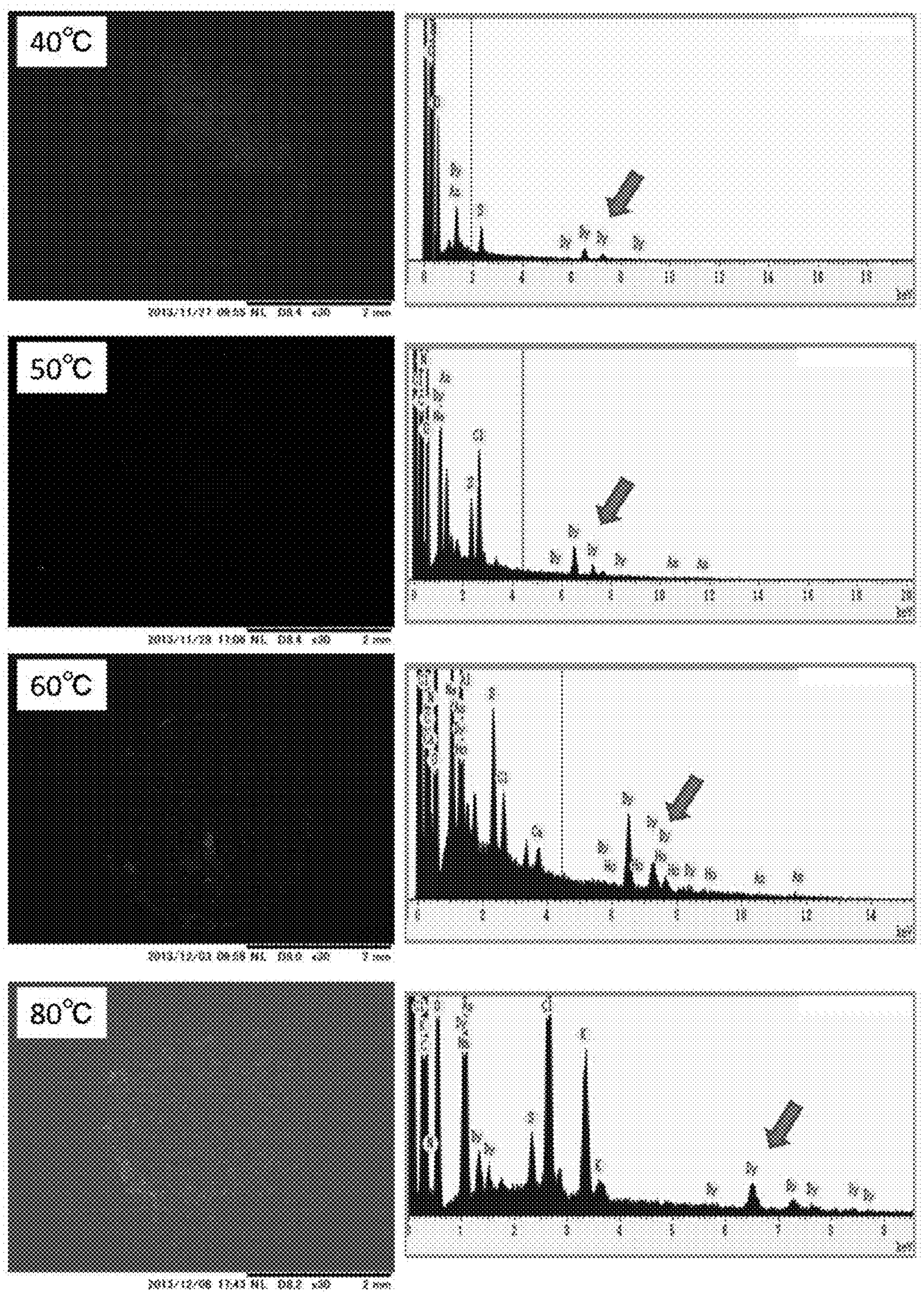
FIG. 16B illustrates an effect of incubation temperature on the mineralization activity of the Lamp-1 peptide.

As shown in FIGS. 16A and 16B, it was found that the mineralization activity was exhibited in a wide range of temperatures, resulting in production of dysprosium hydroxide. In the present Example, preferable mineralization was confirmed in the range of 4 deg C. or higher and 80 deg C. or lower.

Example 16

(Particle Diameter of Particles Produced by Mineralization Activity of Lamp-1 Peptide)

In a HEPES buffer (HEPES 1 mM, pH 7.5), the Lamp-1 peptide (cyclized) was diluted so as to be 10 uM (DMOS 3%), a dysprosium ion as dysprosium nitrate was added and the solution was incubated under room temperature for 5 hours while shaking.

After 5 hours, the solution was centrifuged and washed by stirring in the same manner as in Example 9 and the precipitate finally obtained was subjected to analysis by TEM. The result is shown in FIG. 17.

Figure 17:
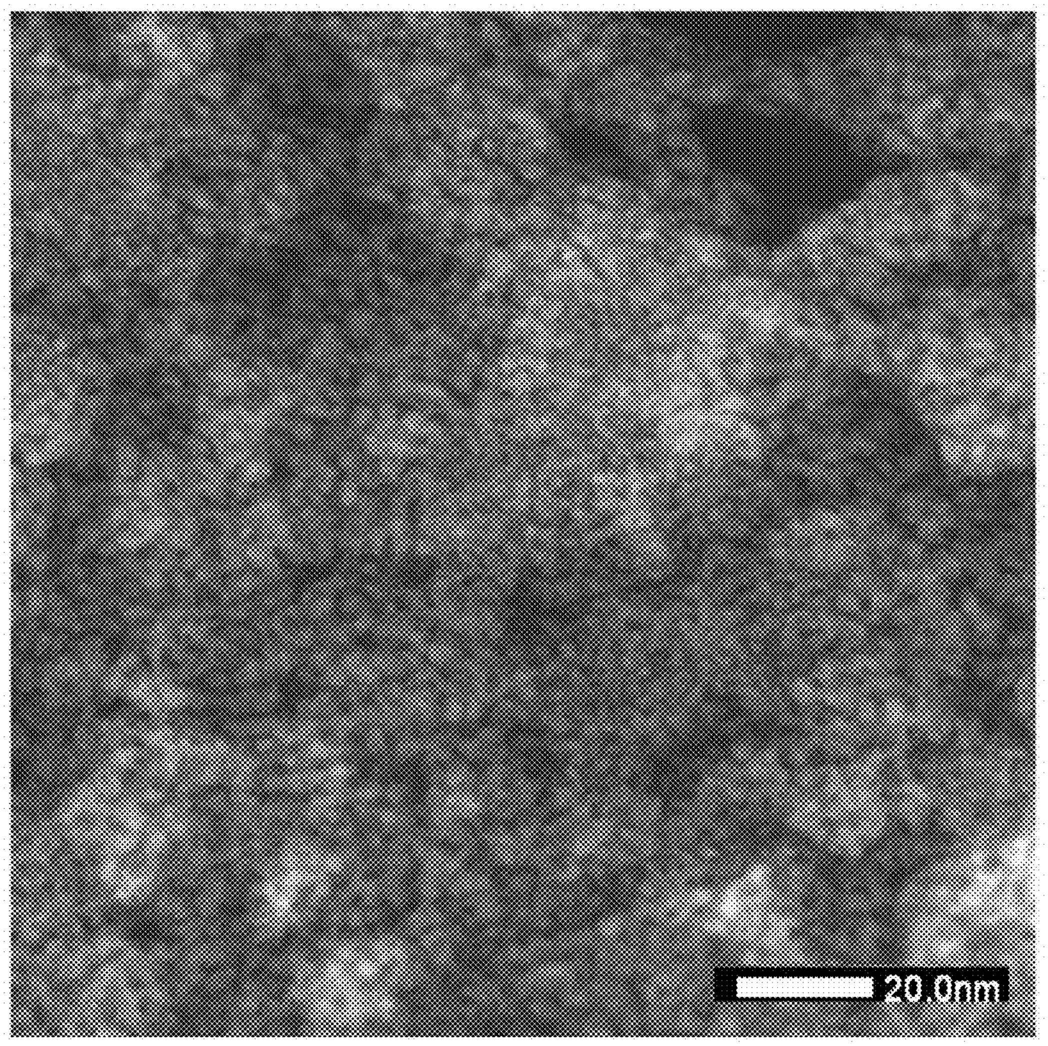
FIG. 17 illustrates the result of TEM observation of dysprosium hydroxide obtained by mineralization using the Lamp-1 peptide.

As shown in FIG. 17, the size of resulting dysprosium hydroxide particles was generally 5 nm or less, and obtainment of particles of the order of nanometers was confirmed.

Example 17

(Mineralization Ability of Lamp-1 Linear Peptide for Dy)

In the present Example, the mineralization ability near Lamp-1 peptide without formation of intramolecular disulfide bond for a dysprosium ion was evaluated. Namely, to an aqueous solution of 1 mM dysprosium nitrate, linear Lamp-1 peptide was added so as to be 20 uM.

After 5 hours, the reaction solution was centrifuged at 15000 rpm for 1 rpm for 10 minutes, the supernatant was removed and 100 ul of ultrapure water was added to the precipitate to wash the precipitate by stirring. After repeating such centrifugation and washing by stirring twice, the precipitate was thoroughly dispersed in 20 ul of ultrapure water, 10 ul of the dispersion was dropped on a carbon tape which was then left in a clean bench until dry. The dried precipitate was analyzed on SEMD/DEX (Hitachi High-Technologies Corporation). The results are shown in FIG. 18.

Figure 18:
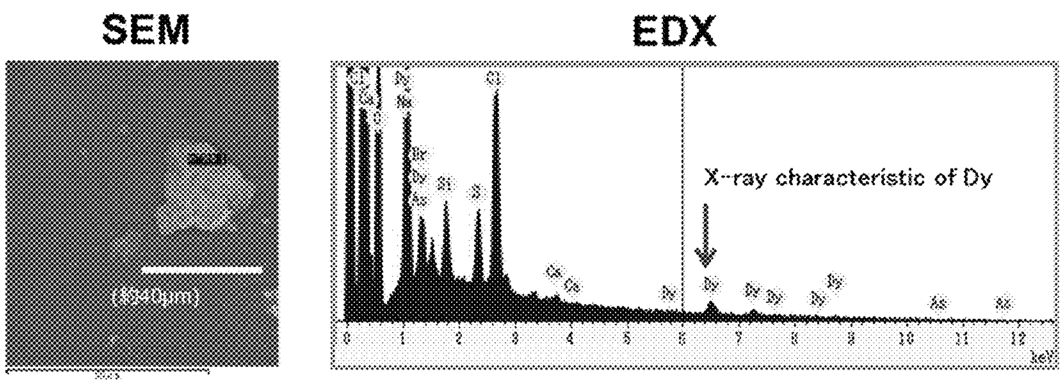
FIG. 18 illustrates a dysprosium mineralization ability of the Lamp-1 peptide (linear).

As shown in FIG. 18, it was found that the linear Lamp-1 had the mineralization ability for dysprosium.

According to the above results, it was found that the peptide of the disclosure can exhibit, whether it is cyclized or linear, an intrinsic rare earth species capturing capability.

[Sequence Listing Free Text]

SEQ ID NOs: 1-34: synthetic peptides

SEQ ID NOs: 35-55: synthetic nucleotides

[Sequence Listing]

What is claimed is:

1. An artificial peptide comprising a peptide region having the amino acid sequence selected from the group consisting of SEQ ID NOs: 4-7, 16, 17, and 31-34.

2. A method for separating a rare earth ion, the method comprising:

bringing one or more medium and/or heavy rare earth ions into contact with a mineralization agent comprising a peptide region having the amino acid sequence selected from the group consisting of SEQ ID NOs: 4-7; or bringing one or more heavy rare earth ions into contact with a mineralization agent comprising a peptide region having an amino acid sequence selected from the group consisting of SEQ ID NOs: 16 and 17; or bringing one or more rare earth ions into contact with a mineralization agent comprising a peptide region having the amino acid sequence selected from the group consisting of SEQ ID NOs: 31-34, wherein the one or more rare earth ions are separated as rare earth minerals, based on a mineralization tendency of the mineralization agents with respect to each rare earth ion series.

3. The method according to claim 2, comprising:

bringing one or more medium and/or heavy rare earth ions into contact with a mineralization agent comprising a peptide region having the amino acid sequence of SEQ ID NO: 4; or bringing one or more heavy rare earth ions into contact with a mineralization agent comprising a peptide region having the amino acid sequence of SEQ ID NO: 16; or bringing one or more rare earth ions into contact with a mineralization agent comprising a peptide region having the amino acid sequence selected from the group consisting of SEQ ID NOs: 31-34.

4. The method according to claim 2, wherein one or more rare earth ions are separated as the rare earth minerals from a mixture of two or more rare earth ions.

5. The method according to claim 2, wherein one or more light rare earth ions are separated.

6. The method according to claim 5, wherein a neodymium ion is separated.

7. The method according to claim 2, wherein one or more heavy rare earth ions are separated.

8. The method according to claim 7, wherein a dysprosium ion is separated.

9. The method according to claim 2, wherein one or more light rare earth ions are separated from one or more heavy rare earth ions.

10. A method for detecting a rare earth ion, the method comprising:

bringing one or more medium/and or heavy rare earth ions into contact with a mineralization agent comprising a peptide region having the amino acid sequence selected from the group consisting of SEQ ID NOs: 4-7; or bringing one or more heavy rare earth ions into contact with a mineralization agent comprising a peptide region having the amino acid sequence selected from the group consisting of SEQ ID NOs: 16 and 17; or bringing one or more rare earth ions into contact with a mineralization agent comprising a peptide region having the amino acid sequence selected from the group consisting of SEQ ID NOs: 31-34, wherein the one or more rare earth ions are separated as rare earth minerals, based on the mineralization tendency of the mineralization agents with respect to each rare earth ion series, and the rare earth minerals or rare earth species in the rare earth minerals are detected.

11. The method according to claim 10, comprising:

bringing one or more medium and/or heavy rare earth ions into contact with a mineralization agent comprising a peptide region having the amino acid sequence of SEQ ID NO: 4; or bringing one or more heavy rare earth ions into contact with a mineralization agent comprising a peptide region having the amino acid sequence of SEQ ID NO: 16; or bringing one or more rare earth ions into contact with a mineralization agent comprising a peptide region having the amino acid sequence selected from the group consisting of SEQ ID NOs: 31-34.

* * * * *